(12) United States Patent
Nam et al.

(10) Patent No.: US 11,589,064 B2
(45) Date of Patent: Feb. 21, 2023

(54) METHOD FOR PROCESSING IMAGE AND APPARATUS THEREFOR

(71) Applicant: LG ELECTRONICS INC., Seoul (KR)

(72) Inventors: Junghak Nam, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/060,598

(22) Filed: Oct. 1, 2020

(65) Prior Publication Data

US 2021/0021848 A1 Jan. 21, 2021

Related U.S. Application Data

(63) Continuation of application No. PCT/KR2019/003606, filed on Mar. 27, 2019.
(Continued)

(30) Foreign Application Priority Data

May 24, 2018 (KR) .......................... 10-2018-0059166

(51) Int. Cl.
*H04N 19/44* (2014.01)
*H04N 19/132* (2014.01)
(Continued)

(52) U.S. Cl.
CPC ........... *H04N 19/44* (2014.11); *H04N 19/132* (2014.11); *H04N 19/176* (2014.11);
(Continued)

(58) Field of Classification Search
CPC .... H04N 19/44; H04N 19/132; H04N 19/176; H04N 19/1883; H04N 19/70; H04N 19/96; H04N 19/463; H04N 19/119
(Continued)

(56) References Cited

U.S. PATENT DOCUMENTS

2013/0251026 A1\* 9/2013 Guo ........................ H04N 19/90
375/240.02
2013/0272381 A1 10/2013 Guo et al.
(Continued)

FOREIGN PATENT DOCUMENTS

EP 3763120 1/2021
WO WO2016090568 6/2016
(Continued)

OTHER PUBLICATIONS

F. Le Léannec, T. Poirier, F. Urban, "Asymmetric Coding Units in QTBT," JVET-D0064, Joint Video Exploration Team (JVET) of ITU-T SG 16 WP 3 and ISO/IEC JTC 1/SC 29/WG 11, 4th Meeting: Chengdu, CN, Oct. 15-21, 2016, 8 pages.
(Continued)

*Primary Examiner* — Matthew K Kwan
(74) *Attorney, Agent, or Firm* — Fish & Richardson P.C.

(57) ABSTRACT

A video decoding method includes: when a current block satisfies a preconfigured condition, parsing a first syntax element indicating whether the current block is split into a plurality of sub-blocks; when the first syntax element indicates that the current block is split, parsing a second syntax element indicating whether the current block is split using a quad-tree structure; when the second syntax element indicates that the current block is not split using the quad-tree structure, parsing at least one of a third syntax element indicating whether the current block is split using a binary-tree structure or a ternary-tree structure and a fourth syntax
(Continued)

element indicating a split direction of the current block; and determining a split mode of the current block based on at least one of the first syntax element, the second syntax element, the third syntax element and the fourth syntax element.

14 Claims, 11 Drawing Sheets

Related U.S. Application Data

(60) Provisional application No. 62/658,541, filed on Apr. 16, 2018, provisional application No. 62/651,239, filed on Apr. 1, 2018.

(51) Int. Cl.
    *H04N 19/176*      (2014.01)
    *H04N 19/169*      (2014.01)
    *H04N 19/70*      (2014.01)
    *H04N 19/96*      (2014.01)

(52) U.S. Cl.
    CPC ......... *H04N 19/1883* (2014.11); *H04N 19/70* (2014.11); *H04N 19/96* (2014.11)

(58) Field of Classification Search
    USPC ..................................................... 375/240.25
    See application file for complete search history.

(56) References Cited

U.S. PATENT DOCUMENTS

2017/0111646 A1    4/2017    Kim et al.
2017/0347128 A1    11/2017    Panusopone et al.

FOREIGN PATENT DOCUMENTS

WO    WO2018016823    1/2018
WO    WO2018037723    3/2018

OTHER PUBLICATIONS

PCT International Search Report in International Appln. No. PCT/KR2019/003606, dated Jul. 11, 2019, 9 pages (with English translation).

Chen et al., "Algorithm description for Versatile Video Coding and Test Model 2 (VTM 2)," JVET-K1002-v1, Joint Video Experts Team (JVET) of ITU-T SG 16 WP 3 and ISO/IEC JTC 1/SC 29/WG 11, 11th Meeting: Ljubljana, SI, dated Jul. 10-18, 2018, 16 pages.

EP Extended European Search Report in European Appln. No. 19782110.1, dated Dec. 17, 2020, 10 pages.

Li et al., "Multi-Type-Tree," JVET-D0117r1, Joint Video Exploration Team (JVET) of ITU-T SG 16 WP 3 and ISO/IEC JTC 1/SC 29/WG 11, 4th Meeting: Chengdu, CN, dated Oct. 15-21, 2016, 3 pages.

Office Action in Japanese Appln. No. 2020-553479, dated Dec. 14, 2021, 12 pages (with English translation).

Wu et al., "Description of SDR video coding technology proposal by IEEE 1857.10 Study Group," JVET-J0032-v1, Presented at Joint Video Experts Team (JVET) of ITU-T SG 16 WP 3 and ISO/IEC JTC 1/SC 29/WG 11, 10th Meeting: San Diego, US, Apr. 10-20, 2018, 48 pages.

Office Action in European Appln. No. 19782110.1, dated Nov. 4, 2022, 8 pages.

* cited by examiner

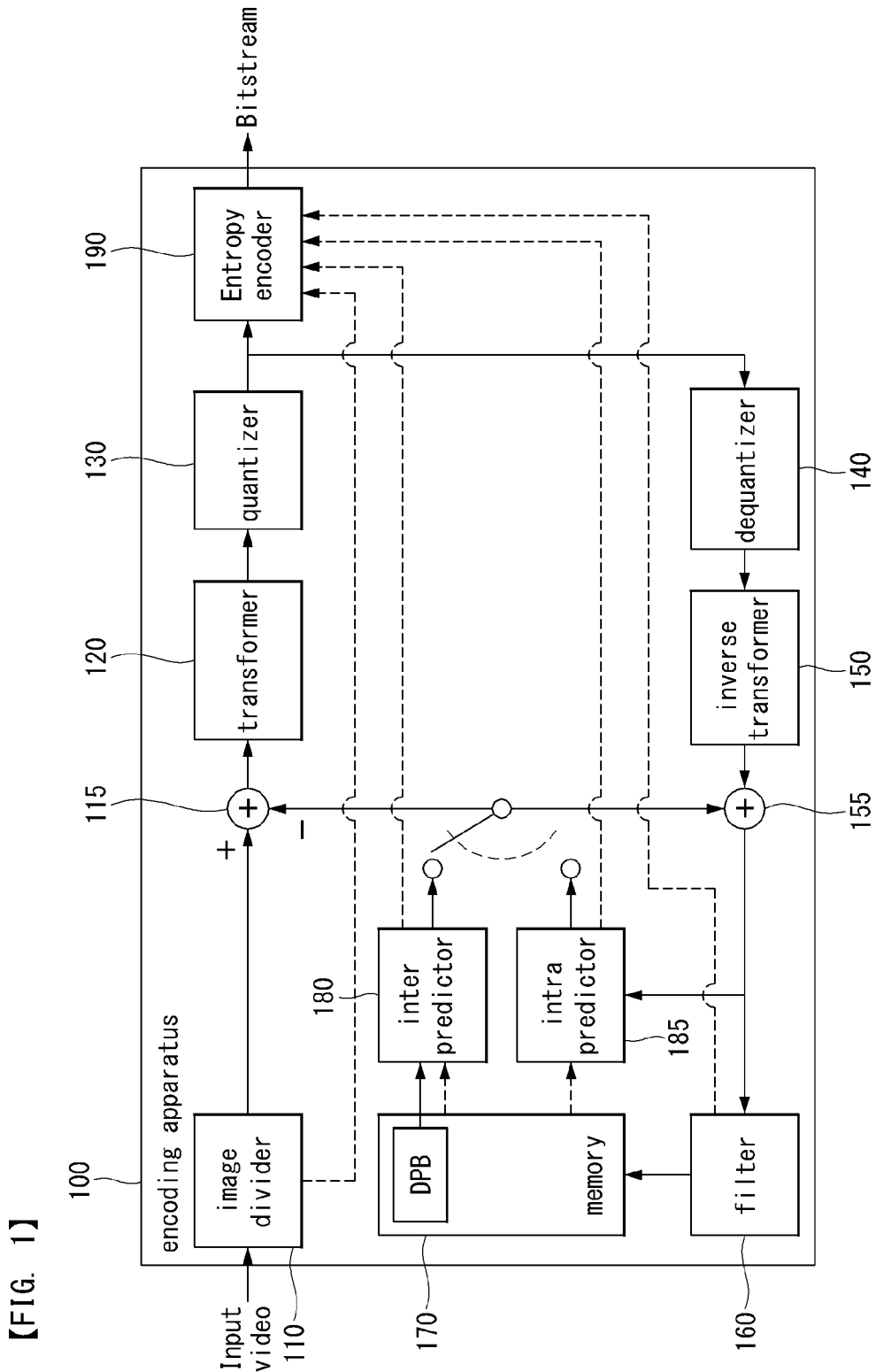
[FIG. 1]

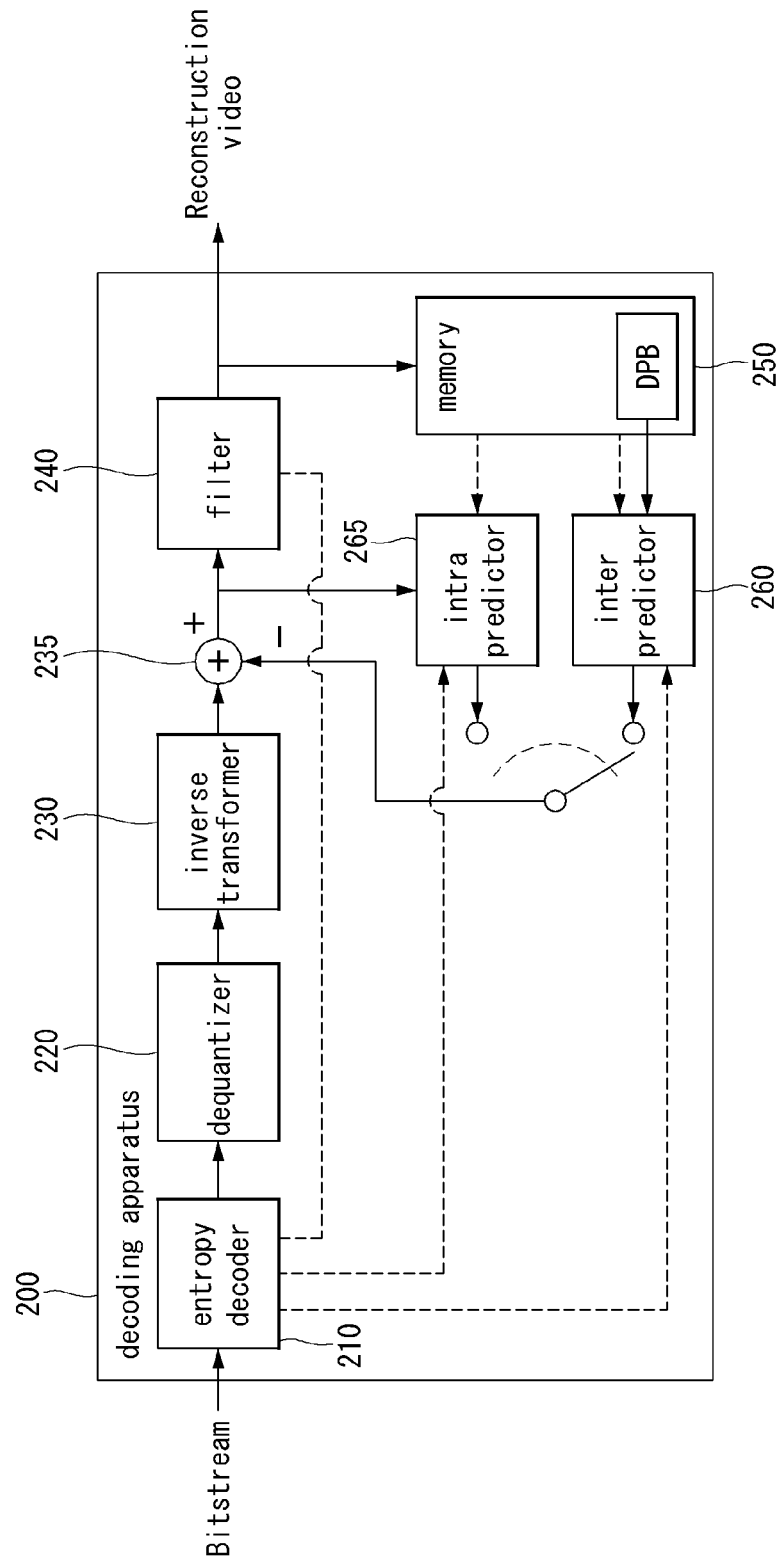
[FIG. 2]

[Fig. 3]
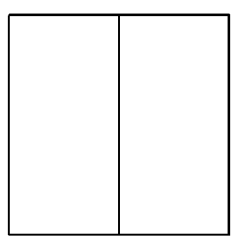 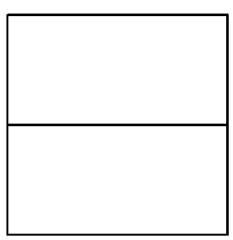 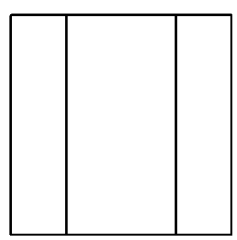 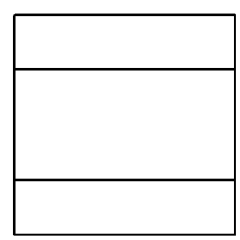
SPLIT_BT_VER    SPLIT_BT_HOR    SPLIT_TT_VER    SPLIT_TT_HOR

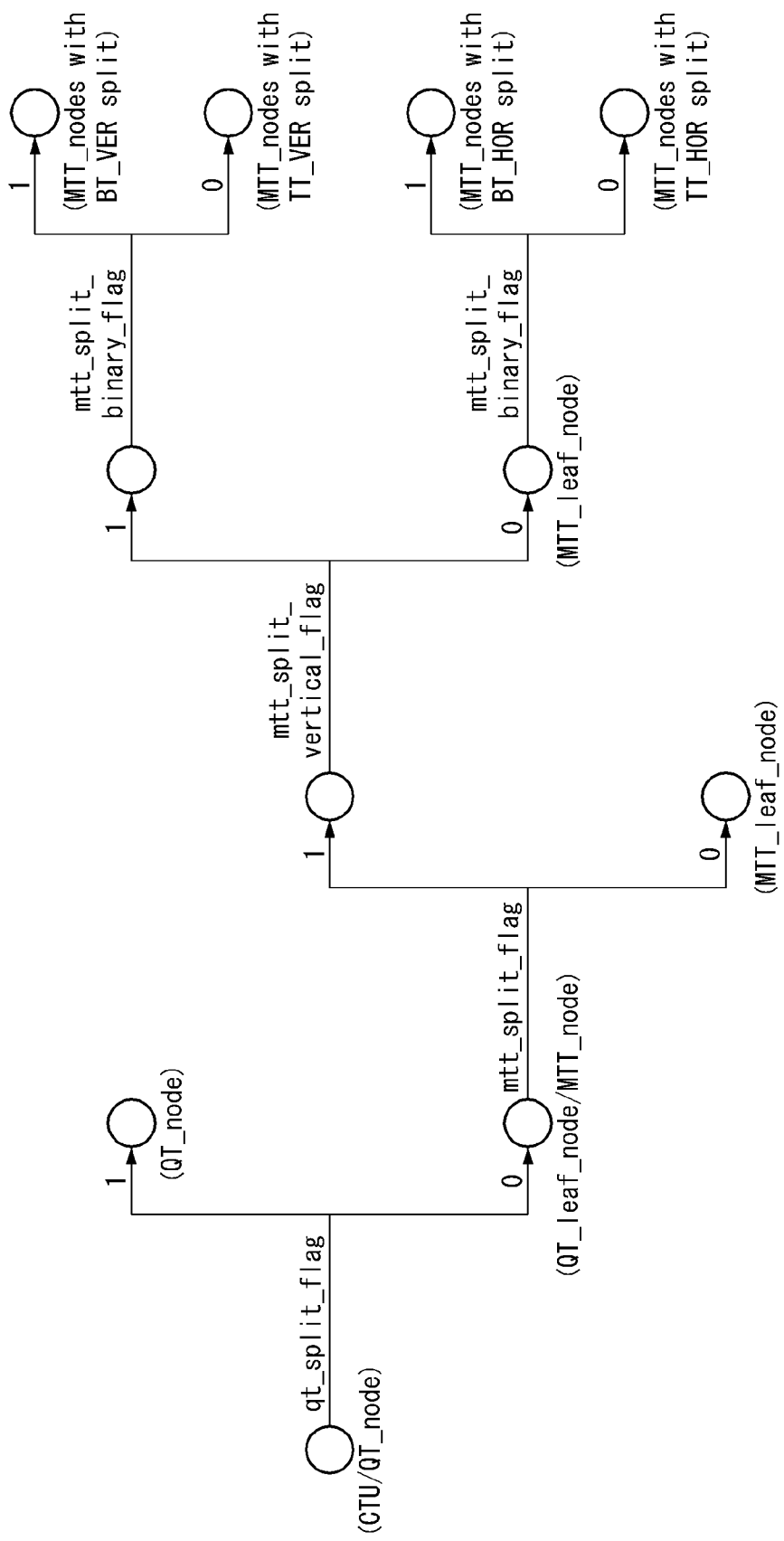

【Fig. 5】
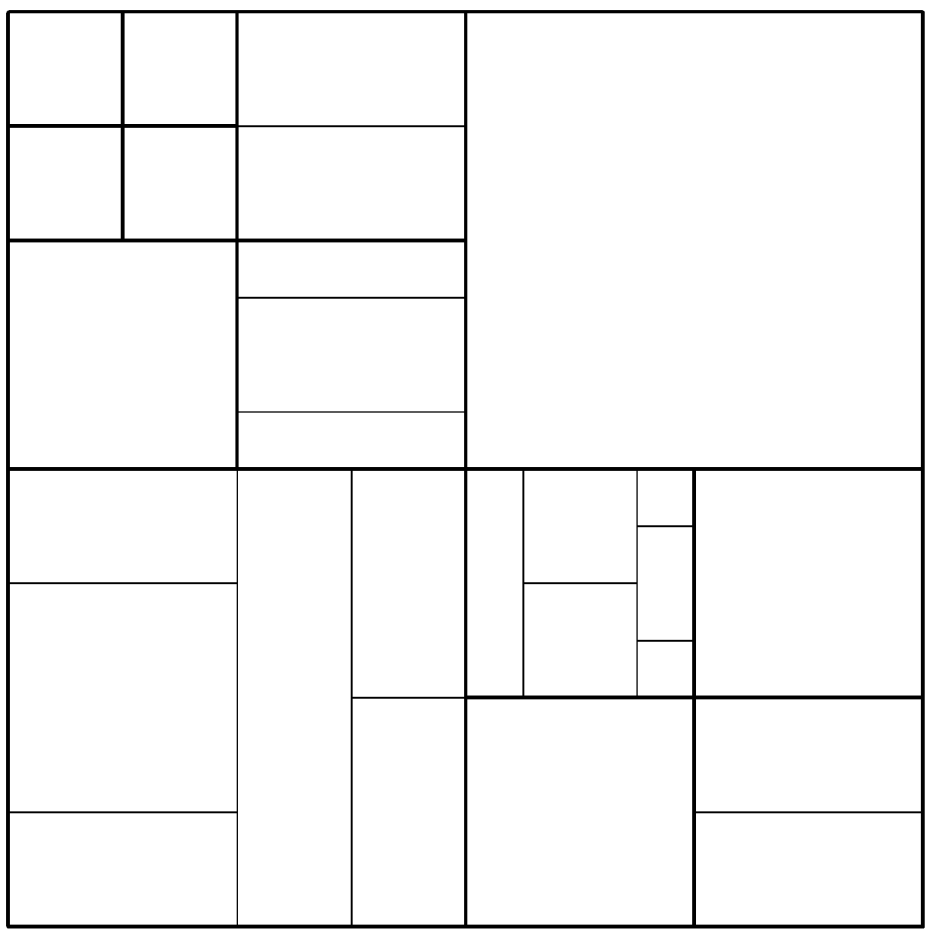

【Fig. 6】
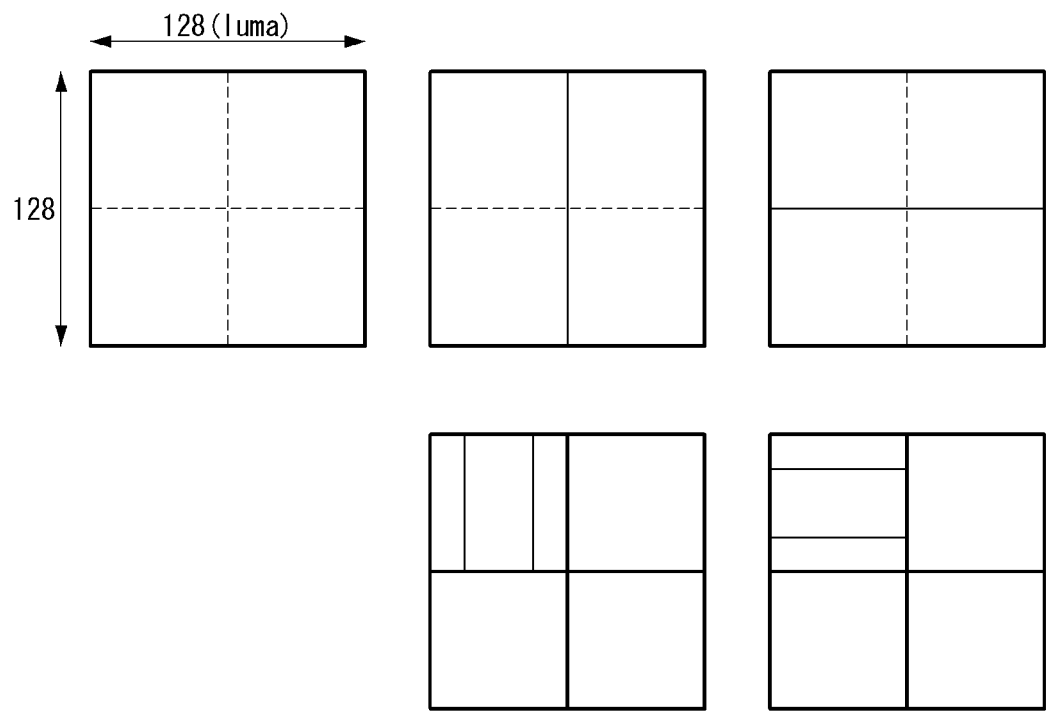
【Fig. 7】
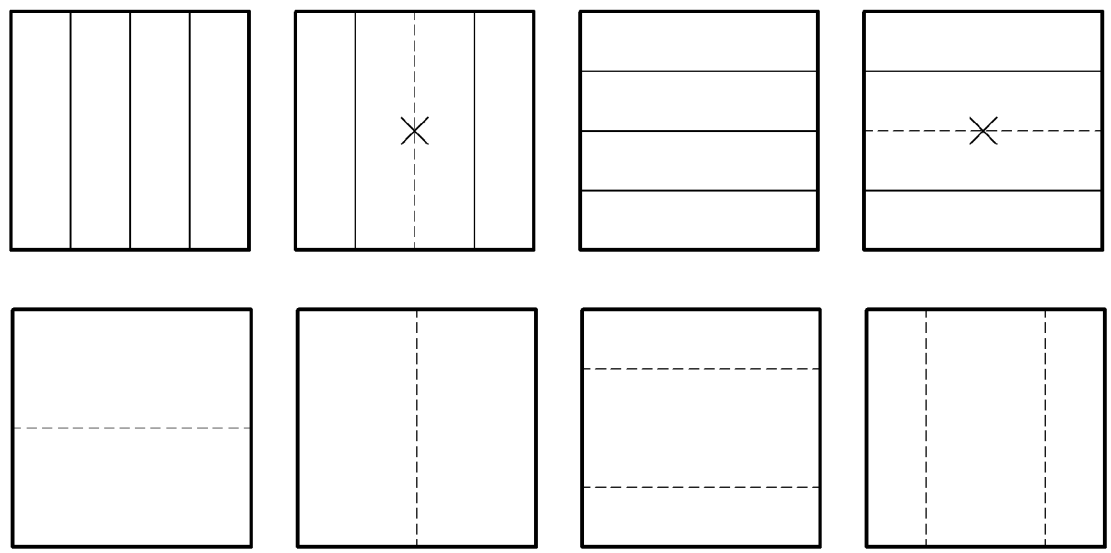
【Fig. 8A】  【Fig. 8B】  【Fig. 8C】  【Fig. 8D】

[Fig. 9]
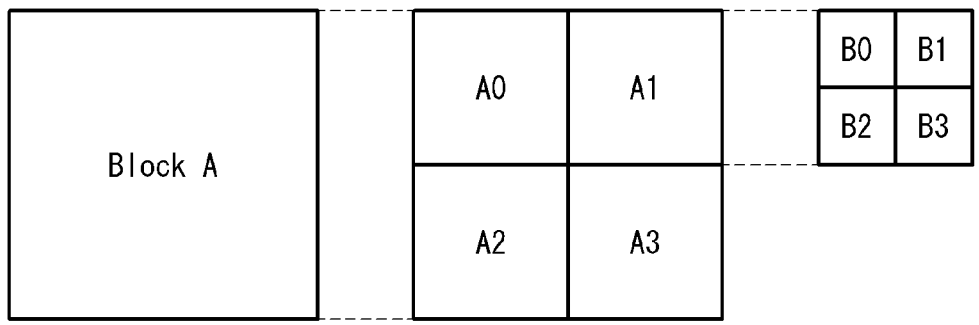
[Fig. 10]
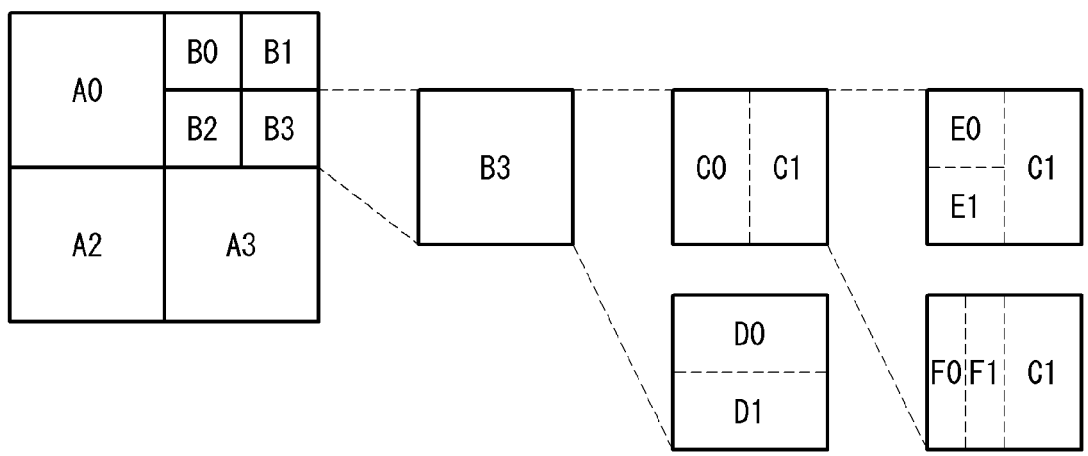
[Fig. 11]
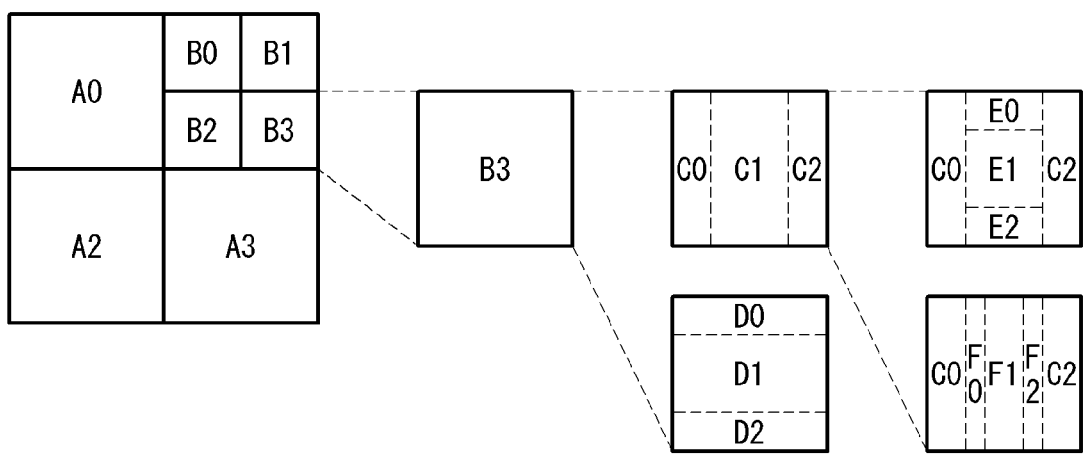

[Fig. 12]
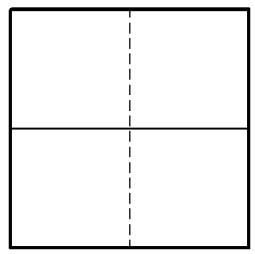 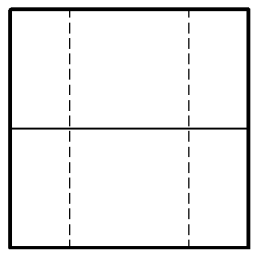 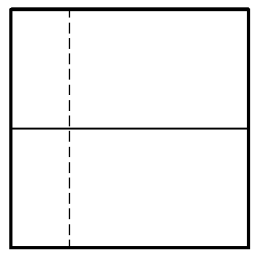 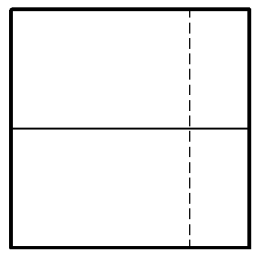
(1) (2) (3) (4)
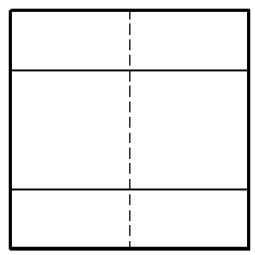 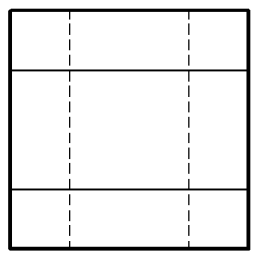 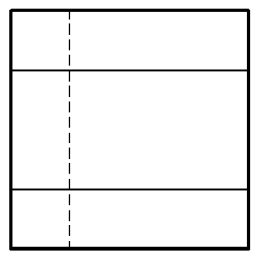 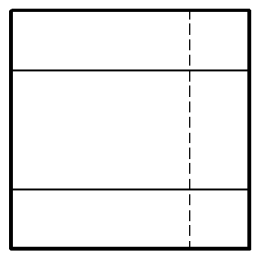
(5) (6) (7) (8)
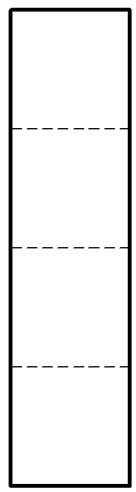 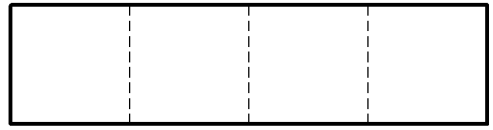
[Fig. 13A] [Fig. 13B]

【Fig. 14】
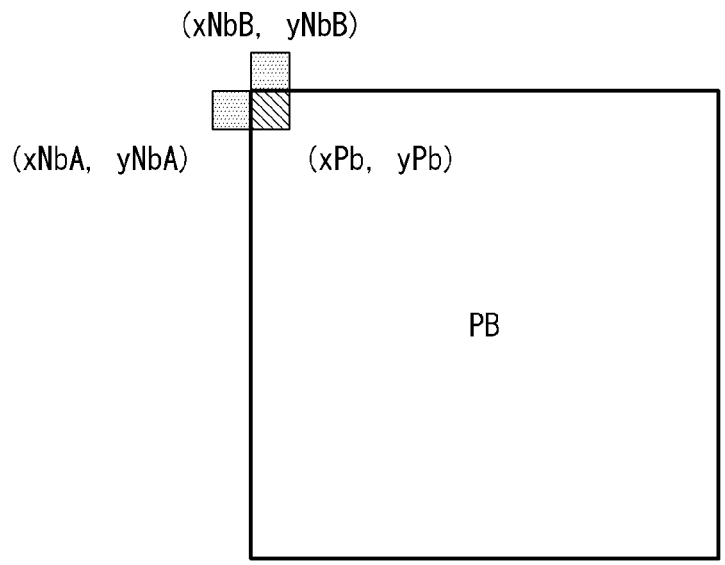
【Fig. 15】
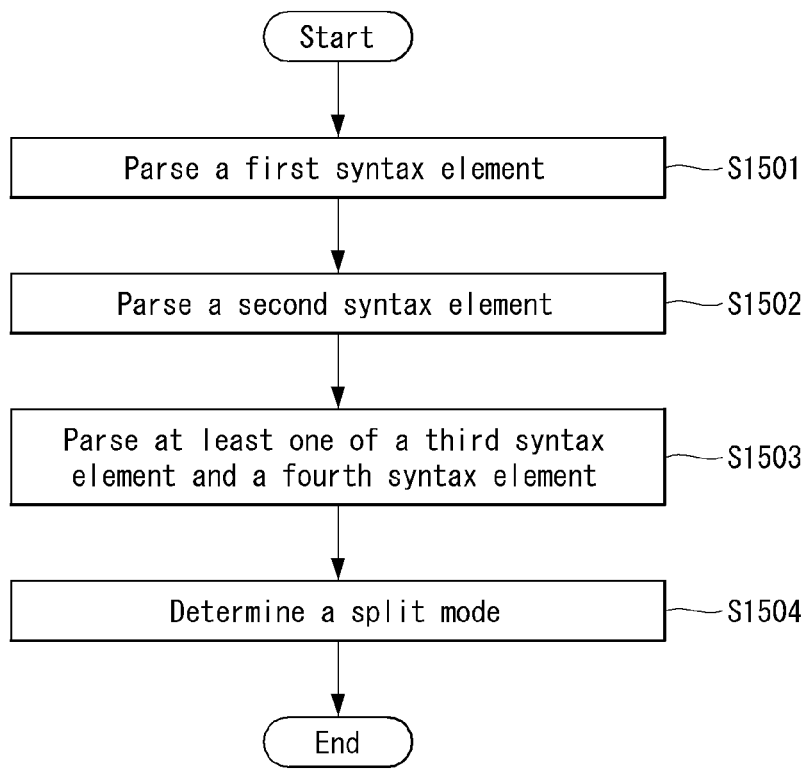

【Fig. 16】
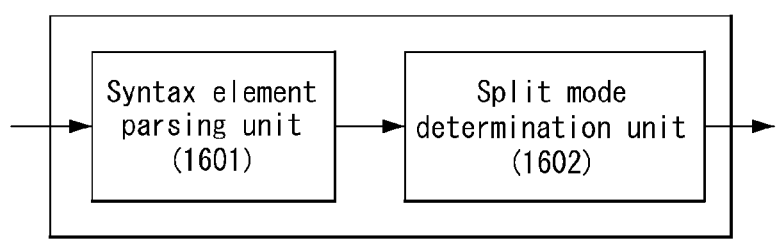
【Fig. 17】
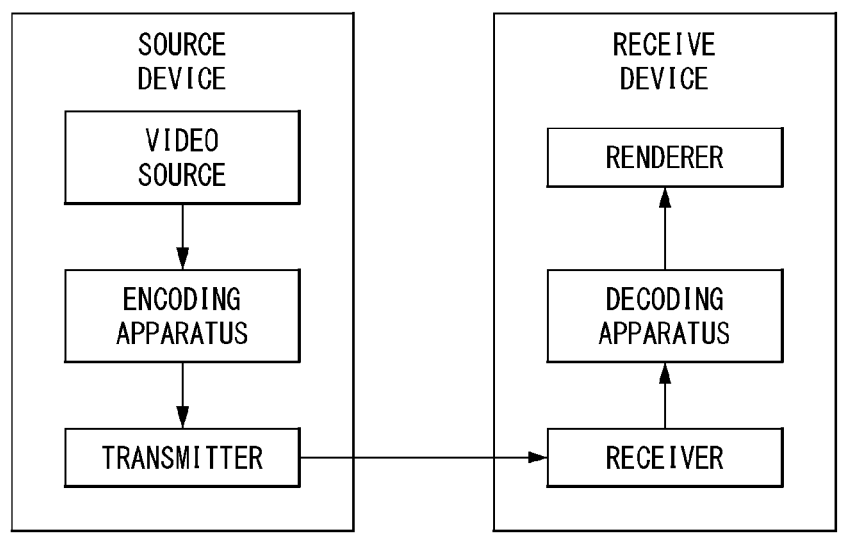

[Fig. 18]
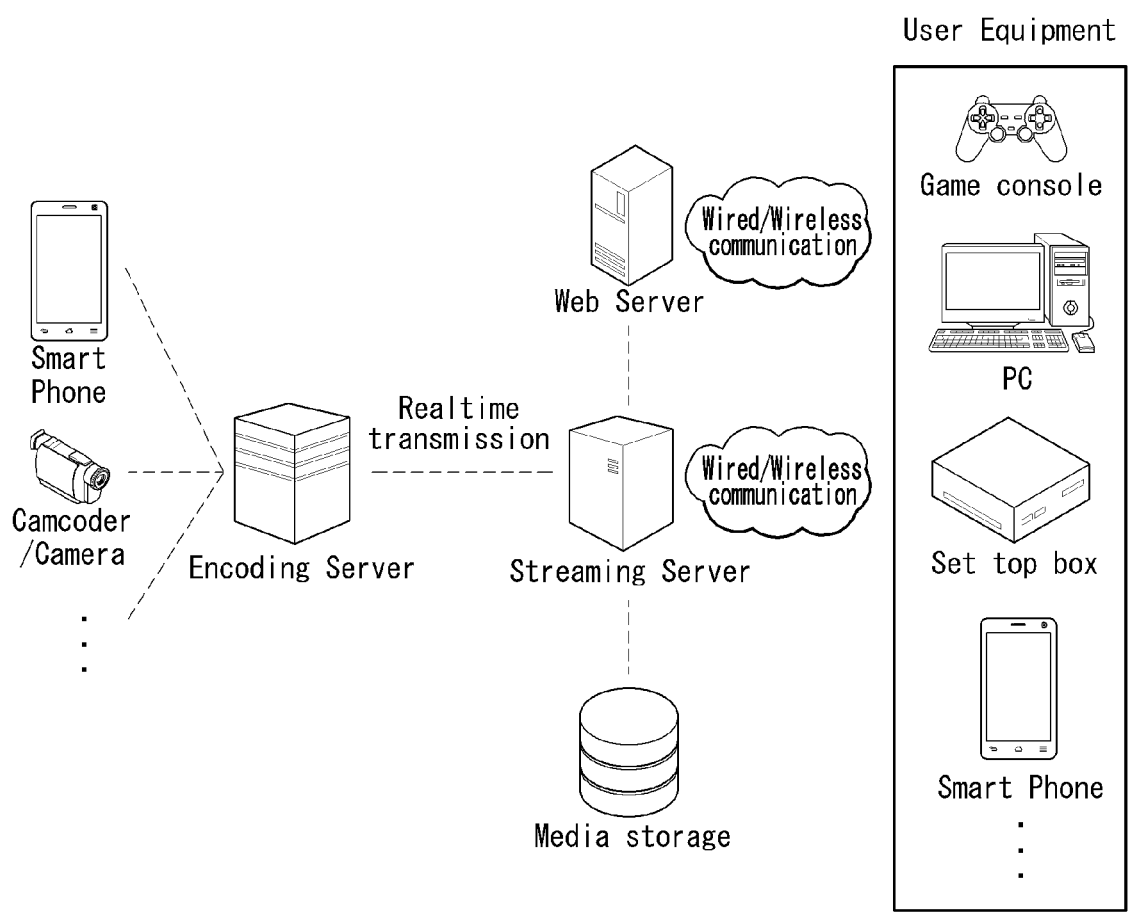

METHOD FOR PROCESSING IMAGE AND APPARATUS THEREFOR

CROSS-REFERENCE TO RELATED APPLICATIONS

This application is a continuation of International Application No. PCT/KR2019/003606, filed on Mar. 27, 2019, which claims the benefit of U.S. Provisional Applications No. 62/651,239, filed on Apr. 1, 2018, and No. 62/658,541, filed on Apr. 16, 2018, and Korean Application No. 10-2018-0059166, filed on May 24, 2018, the contents of which are all hereby incorporated by reference herein in their entirety.

TECHNICAL FIELD

The present disclosure relates to a processing method of a still image or a video image, and more particularly, to a method for determining a split structure of a block to which encoding/decoding is performed and an apparatus for supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

SUMMARY

An object of the present disclosure proposes a method for adjusting a block split efficiently in performing a block split using a QTBT structure.

Another object of the present disclosure proposes a method that supports a QT split after BT and TT splits.

Another object of the present disclosure proposes a stripe tree (ST) structure split method for splitting a non-square block into blocks of a same size.

Another object of the present disclosure proposes a method for efficiently signaling QT, BT, TT split structure information in a same syntax level.

Technical problems to be solved by the present invention are not limited by the above-mentioned technical problems, and other technical problems which are not mentioned above can be clearly understood from the following description by those skilled in the art to which the present invention pertains.

In an aspect of the present disclosure, a video decoding method may include when a current block satisfies a preconfigured condition, parsing a first syntax element indicating whether the current block is split into a plurality of sub-blocks; when the first syntax element indicates that the current block is split, parsing a second syntax element indicating whether the current block is split using a quad-tree structure; when the second syntax element indicates that the current block is not split using the quad-tree structure, parsing at least one of a third syntax element indicating whether the current block is split using a binary-tree structure or a ternary-tree structure and a fourth syntax element indicating a split direction of the current block; and determining a split mode of the current block based on at least one of the first syntax element, the second syntax element, the third syntax element and the fourth syntax element.

Preferably, when the first syntax element indicates that the current block is not split, the method may further include calling a coding unit syntax fora decoding process of the current block.

Preferably, when a value of the first syntax element is 0, the current block may not be split, and when a value of the first syntax element is 1, the current block may be split into 4 sub-blocks using the quad-tree structure, or split into 2 sub-blocks using the binary-tree structure, or split into 3 sub-blocks using the ternary-tree structure.

Preferably, the method may further include calling a coding tree unit syntax for determining a split structure of the sub-block split from the current block based on the split mode.

Preferably, the first syntax element, the second syntax element, the third syntax element and the fourth syntax element may be parsed from a syntax of a same level.

Preferably, the preconfigured condition may be satisfied when a value of a horizontal direction coordinate of a top left sample of the current block added by a width of the current block is equal to or smaller than the width of a current picture, and when a value of a vertical direction coordinate of the top left sample of the current block added by a height of the current block is equal to or smaller than the height of the current picture.

Preferably, the method may further include parsing a fifth syntax element indicating whether the current block split from a block of higher node using the binary-tree structure or the ternary-tree structure is split using the quad-tree structure.

In another aspect of the present disclosure, a video decoding apparatus may include a syntax element parsing unit configured to: when a current block satisfies a preconfigured condition, parse a first syntax element indicating whether the current block is split into a plurality of sub-blocks, when the first syntax element indicates that the current block is split, parse a second syntax element indicating whether the current block is split using a quad-tree structure, and when the second syntax element indicates that the current block is not split using the quad-tree structure, parse at least one of a third syntax element indicating whether the current block is split using a binary-tree structure or a ternary-tree structure and a fourth syntax element indicating a split direction of the current block; and a split mode determination unit configured to determine a split mode of the current block based on at least one of the first syntax element, the second syntax element, the third syntax element and the fourth syntax element.

Preferably, the apparatus may further include a coding unit syntax calling unit configured to call a coding unit syntax for a decoding process of the current block when the first syntax element indicates that the current block is not split.

Preferably, when a value of the first syntax element is 0, the current block may not be split, and when a value of the first syntax element is 1, the current block may be split into 4 sub-blocks using the quad-tree structure, or split into 2 sub-blocks using the binary-tree structure, or split into 3 sub-blocks using the ternary-tree structure.

Preferably, the apparatus may further include a coding tree unit syntax calling unit configured to call a coding tree unit syntax for determining a split structure of the split sub-block from the current block based on the split mode.

Preferably, the first syntax element, the second syntax element, the third syntax element and the fourth syntax element may be parsed from a syntax of a same level.

Preferably, the preconfigured condition may be satisfied when a value of a horizontal direction coordinate of a top left sample of the current block added by a width of the current block is equal to or smaller than the width of a current picture, and when a value of a vertical direction coordinate of the top left sample of the current block added by a height of the current block is equal to or smaller than the height of the current picture.

Preferably, the syntax element parsing unit may parse a fifth syntax element indicating whether the current block split from a block of a higher node using the binary-tree structure or the ternary-tree structure is split using the quad-tree structure.

According to an embodiment of the present disclosure, QTBT split structure is efficiently determined, and the related information is signaled, and accordingly, a compression efficiency may be improved.

Effects which may be obtained by the present disclosure are not limited to the effects described above, and other technical effects not described above may be evidently understood by a person having ordinary skill in the art to which the present disclosure pertains from the following description.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

FIG. 1 is a schematic block diagram of an encoding apparatus which encodes a video/image signal as an embodiment to which the present disclosure is applied.

FIG. 2 is a schematic block diagram of a decoding apparatus for decoding a video/image signal as an embodiment to which the disclosure is applied.

FIG. 3 is a diagram illustrating an example of a multi-type tree structure as an embodiment to which the present disclosure may be applied.

FIG. 4 is a diagram illustrating a signaling mechanism of partition split information of a quadtree with nested multi-type tree structure as an embodiment to which the present disclosure may be applied.

FIG. 5 is a diagram illustrating a method of partitioning a CTU into multiple CUs based on a quadtree and nested multi-type tree structure as an embodiment to which the present disclosure may be applied.

FIG. 6 is a diagram illustrating a method for limiting a ternary-tree split as an embodiment to which the present disclosure may be applied.

FIG. 7 is a diagram illustrating redundant split patterns that may be generated in binary-tree split and ternary-tree split as an embodiment to which the present disclosure may be applied.

FIGS. 8A through 8D are diagrams illustrating a method for partitioning a block based on quad-tree and nested multi-type tree structure as an embodiment to which the present disclosure may be applied.

FIG. 9 is a diagram illustrating a quad-tree based block split structure as an embodiment to which the present disclosure may be applied.

FIG. 10 is a diagram illustrating a binary-tree based block split structure as an embodiment to which the present disclosure may be applied.

FIG. 11 is a diagram illustrating a ternary-tree based block split structure as an embodiment to which the present disclosure may be applied.

FIG. 12 is a diagram illustrating a binary-tree and ternary-tree based block split structure as an embodiment to which the present disclosure may be applied.

FIGS. 13A and 13B are diagrams illustrating a method for splitting a block based on a stripe tree structure as an embodiment to which the present disclosure may be applied.

FIG. 14 is a diagram illustrating a reference position of a current block and a neighboring block as an embodiment to which the present disclosure may be applied.

FIG. 15 is a flowchart illustrating a decoding method of a video signal according to an embodiment to which the present disclosure is applied.

FIG. 16 is a flowchart illustrating a decoding apparatus of a video signal according to an embodiment to which the present disclosure is applied.

FIG. 17 illustrates a video coding system to which the present disclosure is applied.

FIG. 18 is a configuration diagram of a content streaming system as an embodiment to which the present disclosure is applied.

DETAILED DESCRIPTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an MxN block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include a N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtszie (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.
Otherwise (the block is a BTT node or the size of the block is smaller than or equal to the minimum QT size), the block is forced to be split with SPLIT_BT_HOR mode.

Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

Meanwhile, the quad-tree coding tree scheme with nested multi-type tree described above may provide very flexible partitioning structure. Owing to the split types supported in the multi-type tree, different split patterns may bring a result of the same coding block structure in some cases. By limiting generations of such redundant split patterns, a data amount of partitioning information may be reduced. This is described with reference to the following drawing.

FIG. 7 is a diagram illustrating redundant split patterns that may be generated in binary-tree split and ternary-tree split as an embodiment to which the present disclosure may be applied.

As shown in FIG. 7, two levels of consecutive binary splits in one direction may have the same coding block structure as the binary split for a center partition after a ternary split. In this case, the binary-tree split for the center partition of the ternary-tree split may be limited (in the given direction). Such a limit may be applied to CUs of all pictures. In the case that such a specific split is limited, signaling of the corresponding syntax elements may be modified by reflecting the limited case, and through this, the number of bits signaled for partitioning may be reduced. For example, as exemplified in FIG. 7, in the case that the binary-tree split for the center partition of a CU is limited, mtt_split_cu_binary_flag syntax element that indicates whether a split is the binary split or the ternary split may not be signaled, and the value may be inferred by a decoder as 0.

As described above, a CTU (or CTB (Coding Tree Block), CU (C, CB)) may be partitioned based on the multi-type tree structure split including binary-tree (BT) and ternary-tree (TT) as well as quad-tree. In partitioning a block based on the split structure and performing coding based on the partitioned block unit, an embodiment of the present disclosure proposes a method for improving a coding rate.

An object of the present disclosure is to propose a method for adjusting a block split efficiently in performing a block partition using the QTBT structure.

In addition, an object of the present disclosure proposes a method for supporting a QT split after BT and TT splits.

In addition, an object of the present disclosure is to propose a stripe tree (ST) structure split method for splitting a non-square block into blocks of a same size.

In addition, an object of the present disclosure is to propose a method for signaling QT, BT, TT split structure information in a same syntax level efficiently.

According to an embodiment of the present disclosure, the QTBT structure may be efficiently determined, and the related information is signaled, and consequently, a compression performance may be improved significantly.

Embodiment 1

In an embodiment of the present disclosure, an encoder/decoder may perform a block split with BT (binary-tree) or TT (ternary-tree) structure (i.e., multi-type tree structure). As an embodiment, a CTU or a single QT end block (i.e., a leaf node block of the QT structure) may be partitioned into two lower blocks by BT. In addition, a CTU or a single QT end block may be partitioned into three lower blocks by TT.

FIGS. 8A through 8D are diagrams illustrating a method for partitioning a block based on quad-tree and nested multi-type tree structure as an embodiment to which the present disclosure may be applied.

Referring to FIGS. 8A through 8D, it is shown a partitioning method by BT and TT. In FIGS. 8A through 8D, it is assumed the case that a square block is partitioned in a horizontal or vertical direction, but the present disclosure is not limited thereto, and a non-square block may also be partitioned.

In the case of being partitioned in the BT structure, a single block may be partitioned into two lower blocks in a horizontal direction or vertical direction as shown in FIGS. 8A and 8B. That is, the partitioned block may have two N×2N shapes or two 2N×N shapes.

In the case of being partitioned in the TT structure, a single block may be partitioned into three lower blocks in a horizontal direction or vertical direction as shown in FIGS. 8C and 8D. In the case that a block is partitioned into three blocks, one block is great, and two blocks are small, or three blocks may be equivalently partitioned. As an example, in the case of a horizontal directional partition, a height may be partitioned in 1:2:1 ratio, and in the case of a vertical directional partition, a width may be partitioned in 1:2:1 ratio.

Embodiment 2

A compression efficiency may be improved by increasing a degree of freedom through a block split of various structures, but a complexity increase due to the improved split degree of freedom may be problematic. Accordingly, in an embodiment of the present disclosure, in performing a block split based on the QT structure, it is proposed a method for transmitting syntax for adjusting QT split degree by considering a relation between a performance and a complexity.

As an embodiment, an encoder may transmit at least one syntax (or syntax element) of a maximum QT block size (MaxQTSize), a minimum QT block size (MinQTSize) and a maximum QT block split depth (MaxQTDepth). Here, the maximum QT block size may represent a maximum size of a block for which QT split is available and may be expressed as a log scale form (e.g., log 2). The minimum QT block size may represent a minimum size of a block for which QT split is available and may be expressed as a log scale form (e.g., log 2). Furthermore, the maximum QT block split depth may represent the number of QT splits from the maximum QT block size.

Depending on a type of slice (or tile group), tile, and image component, each of the syntax information may be transmitted through Sequence Parameter Set (SPS), Picture Parameter Set (PPS), Slice Header (SH) (or Tile Group Header (TGH)) or a header of Network Abstract Layer (NAL) unit.

With respect to a single image (or sequence, picture, tile, tile group), the syntaxes described above may be transmitted in complementary manner. As an embodiment, a single image may be transmitted in a combination of the following embodiments.

(1) Maximum QT block size, minimum QT block size
(2) Maximum QT block size, maximum QT block split depth (3) Minimum QT block size, maximum QT block split depth (4) Maximum QT block size, minimum QT block size, maximum QT block split depth Referring to embodiment (1), an encoder may signal the maximum QT block size and the minimum QT block size syntax (or syntax element) to a decoder, and the decoder may induce the maximum QT block split depth value by using the maximum QT block size and the minimum QT block size. In addition, referring to embodiment (2), an encoder may signal the maximum QT block size and the maximum QT block split depth syntax to a decoder. The decoder may induce the minimum QT block split depth value by using the maximum QT block size and the maximum QT block split depth. Furthermore, referring to embodiment (3), an encoder may signal the minimum QT block size and the maximum QT block split depth syntax to a decoder. The decoder may induce the maximum QT block size value by using the minimum QT block size and the maximum QT block split depth. In addition, referring to embodiment (4), an encoder may signal all of three syntaxes. In this case, a value of the maximum QT block split depth may be the same as a difference between the maximum QT block size and the minimum QT block size.

Embodiment 3

In an embodiment of the present disclosure, in performing a block split based on the BT structure, a syntax for adjusting BT split degree may be transmitted by considering a relation between a performance and a complexity.

As an embodiment, an encoder may transmit at least one syntax (or syntax element) of a maximum BT block size (MaxBTSize), a minimum BT block size (MinBTSize) and a maximum BT block split depth (MaxBTDepth). Here, the maximum BT block size may represent a maximum size of a block for which BT split is available and may be expressed as a log scale form (e.g., log 2). The minimum BT block size may represent a minimum size of a block for which BT split is available and may be expressed as a log scale form (e.g., log 2). Furthermore, the maximum BT block split depth may represent the number of BT splits from the maximum BT block size.

Depending on a type of slice (or tile group), tile, and image component, each of the syntax information may be transmitted through Sequence Parameter Set (SPS), Picture Parameter Set (PPS), Slice Header (SH) (or Tile Group Header (TGH)) or a header of Network Abstract Layer (NAL) unit.

With respect to a single image (or sequence, picture, tile, tile group), the syntaxes described above may be transmitted in complementary manner. As an embodiment, a single image may be transmitted in a combination of the following embodiments.

(1) Maximum BT block size, minimum BT block size (2) Maximum BT block size, maximum BT block split depth (3) Minimum BT block size, maximum BT block split depth (4) Maximum BT block size, minimum BT block size, maximum BT block split depth Referring to embodiment (1), an encoder may signal the maximum BT block size and the minimum BT block size syntax (or syntax element) to a decoder, and the decoder may induce the maximum BT block split depth value by using the maximum BT block size and the minimum BT block size. In addition, referring to embodiment (2), an encoder may signal the maximum BT block size and the maximum BT block split depth syntax to a decoder. The decoder may induce the minimum BT block split depth value by using the maximum BT block size and the maximum BT block split depth. Furthermore, referring to embodiment (3), an encoder may signal the minimum BT block size and the maximum BT block split depth syntax to a decoder. The decoder may induce the maximum BT block size value by using the minimum BT block size and the maximum BT block split depth. In addition, referring to embodiment (4), an encoder may signal all of three syntaxes. In this case, a value of the maximum BT block split depth may be different from a difference between the maximum BT block size and the minimum BT block size. This is because a size of block in which BT split is starting is dependent upon QT split.

In an embodiment, the maximum BT block split depth signaled in (2) to (4) described above, may be signaled as a maximum depth of a multi-type tree split including the BT structure and the TT structure. In other words, the maximum BT block split depth may be the same as the maximum MTT block split depth.

An encoder/decoder may adjust (or control) a performance and a complexity by using the maximum BT block split depth value. In addition, in the case that a size of a block at which a BT split is started is small, it reaches to the minimum BT block size faster than the maximum BT block split depth. In this case, no more BT split is allowed for the corresponding block.

Embodiment 4

In an embodiment of the present disclosure, in performing a block split based on the TT structure, a syntax for adjusting TT split degree may be transmitted by considering a relation between a performance and a complexity.

As an embodiment, an encoder may transmit at least one syntax (or syntax element) of a maximum TT block size (MaxTTSize), a minimum TT block size (MinTTSize) and a maximum TT block split depth (MaxTTDepth). Here, the maximum TT block size may represent a maximum size of a block for which TT split is available and may be expressed as a log scale form (e.g., log 2). The minimum TT block size may represent a minimum size of a block for which TT split is available and may be expressed as a log scale form (e.g., log 2). Furthermore, the maximum TT block split depth may represent the number of TT splits from the maximum TT block size.

Depending on a type of slice (or tile group), tile, and image component, each of the syntax information may be transmitted through Sequence Parameter Set (SPS), Picture Parameter Set (PPS), Slice Header (SH) (or Tile Group Header (TGH)) or a header of Network Abstract Layer (NAL) unit.

With respect to a single image (or sequence, picture, tile, tile group), the syntaxes described above may be transmitted in complementary manner. As an embodiment, a single image may be transmitted in a combination of the following embodiments.

(1) Maximum TT block size, minimum TT block size (2) Maximum TT block size, maximum TT block split depth (3) Minimum TT block size, maximum TT block split depth (4) Maximum TT block size, minimum TT block size, maximum TT block split depth Referring to embodiment (1), an encoder may signal the maximum TT block size and the minimum TT block size syntax (or syntax element) to a decoder, and the decoder may induce the maximum TT block split depth value by using the maximum TT block size and the minimum TT block size.

In addition, referring to embodiment (2), an encoder may signal the maximum TT block size and the maximum TT block split depth syntax to a decoder. The decoder may induce the minimum TT block split depth value by using the maximum TT block size and the maximum TT block split depth.

Furthermore, referring to embodiment (3), an encoder may signal the minimum TT block size and the maximum TT block split depth syntax to a decoder. The decoder may induce the maximum TT block size value by using the minimum TT block size and the maximum TT block split depth.

In addition, referring to embodiment (4), an encoder may signal all of three syntaxes. In this case, a value of the maximum TT block split depth may be different from a difference between the maximum TT block size and the minimum TT block size. This is because a size of block in which TT split is starting is dependent upon QT split.

An encoder/decoder may control (or adjust) a performance and a complexity by using the maximum TT block split depth value. In addition, in the case that a size of a block at which a TT split is started is small, it reaches to the minimum TT block size earlier than the maximum TT block split depth. In this case, no more TT split is allowed for the corresponding block.

In an embodiment, the maximum TT block split depth signaled in (2) to (4) described above, may be signaled as a maximum depth of a multi-type tree split including the BT structure and the TT structure. In other words, the maximum BT block split depth may be the same as the maximum MTT block split depth.

In an embodiment, the maximum TT block size may be defined as 16×16. In this case, one side length of a TT block may be defined as 4, 8, 4. In addition, the minimum TT block size may be represented as log 2_min_luma_TT_block_size_minus4, and a difference between the minimum TT block size and the maximum TT block size may be represented as log 2_diff_max_min_luma_TT_block_size.

A decoder may induce a TT block size variable (TTb Log 2SizeY) by using the minimum TT block size. For example, the TT block size variable (TTb Log 2SizeY) may be induced by using the following Equations 1 and 2.

Min *TTb* Log 2Size*Y*=log 2_min_luma_*TT*_block_size_minus4+4  [Equation 1]

*TTb* Log 2Size*Y*=Min *TTb* Log 2Size*Y*+log 2_diff_max_min_luma_*TT*_block_size  [Equation 2]

The TT block size variable (TTb Log 2SizeY) induced through the Equation may be used in the subsequent decoding process. For example, the TT block size variable (TTb Log 2SizeY) may be used in an intra prediction, an inter prediction, a filtering, a transform, a quantization and an entropy decoding process.

Embodiment 5

In an embodiment of the present disclosure, in performing a block split based on the BT and TT structure (may be referred to as MTT or BTT as a multi-type tree structure), an encoder/decoder may transmit a syntax for adjusting a degree of MTT split by considering a relation between a performance and a complexity.

As an embodiment, an encoder may transmit at least one syntax (or syntax element) of a maximum MTT block size (MaxMTTSize), a minimum MTT block size (MinMTTSize) and a maximum MTT block split depth (MaxBTTDepth). Here, the maximum MTT block size may represent a maximum size of a block for which MTT split is available and may be expressed as a log scale form (e.g., log 2). The minimum MTT block size may represent a minimum size of a block for which MTT split is available and may be expressed as a log scale form (e.g., log 2). Furthermore, the maximum MTT block split depth may represent the number of MTT splits from the maximum MTT block size.

Depending on a type of slice (or tile group), tile, and image component, each of the syntax information may be transmitted through Sequence Parameter Set (SPS), Picture Parameter Set (PPS), Slice Header (SH) (or Tile Group Header (TGH)) or a header of Network Abstract Layer (NAL) unit.

With respect to a single image (or sequence, picture, tile, tile group), the syntaxes described above may be transmitted in complementary manner. As an embodiment, a single image may be transmitted in a combination of the following embodiments.

(1) Maximum MTT block size, minimum MTT block size
(2) Maximum MTT block size, maximum MTT block split depth
(3) Minimum MTT block size, maximum MTT block split depth
(4) Maximum MTT block size, minimum MTT block size, maximum MTT block split depth Referring to embodiment (1), an encoder may signal the maximum MTT block size and the minimum MTT block size syntax (or syntax element) to a decoder, and the decoder may induce the maximum MTT block split depth value by using the maximum MTT block size and the minimum MTT block size.

In addition, referring to embodiment (2), an encoder may signal the maximum MTT block size and the maximum MTT block split depth syntax to a decoder. The decoder may induce the minimum MTT block split depth value by using the maximum MTT block size and the maximum MTT block split depth.

Furthermore, referring to embodiment (3), an encoder may signal the minimum MTT block size and the maximum MTT block split depth syntax to a decoder. The decoder may induce the maximum MTT block size value by using the minimum MTT block size and the maximum MTT block split depth.

In addition, referring to embodiment (4), an encoder may signal all of three syntaxes. In this case, a value of the maximum MTT block split depth may be different from a difference between the maximum MTT block size and the minimum MTT block size. This is because a size of block in which MTT split is starting is dependent upon QT split.

An encoder/decoder may control (or adjust) a performance and a complexity by using the maximum MTT block split depth value. In addition, in the case that a size of a block at which an MTT split is started is small, it reaches to the minimum MTT block size faster than the maximum MTT block split depth. In this case, no more MTT split is allowed for the corresponding block.

Embodiment 6

FIG. 9 is a diagram illustrating a quad-tree based block split structure as an embodiment to which the present disclosure may be applied.

Referring to FIG. 9, in an embodiment of the present disclosure, a single block may be split based on quad-tree (QT). In addition, a single sub-block split in the QT structure may be further split recursively in the QT structure. An end block (may be referred to as a leaf block or a leaf node block) that is no more split in the QT structure may be split by at least one of binary tree (BT), ternary tree (TT) or asymmetric tree (AT).

As an example, the block A may be split into four sub-blocks A0, A1, A2 and A3 in the QT structure. In addition, the sub-block A1 may be further split into four sub-blocks B0, B1, B2 and B3 again in the QT structure.

FIG. 10 is a diagram illustrating a binary-tree based block split structure as an embodiment to which the present disclosure may be applied.

Referring to FIG. 10, a BT may have two shapes of splits including a horizontal directional BT (e.g., 2N×N, 2N×N) and a vertical directional BT (e.g., N×2N, N×2N).

As an example, a block no more split in the QT structure (i.e., leaf node block) B3 may be split into a vertical directional BT C0 and C1 or a horizontal directional BT D0 and D1. In the case of being split in the vertical direction, like block C0, each of the sub-blocks may be recursively split in a horizontal directional BT E0 and E1 or a vertical directional BT F0 and F1.

FIG. 11 is a diagram illustrating a ternary-tree based block split structure as an embodiment to which the present disclosure may be applied.

Referring to FIG. 11, a TT may have two shapes of splits including a horizontal directional TT (e.g., 2N×½N, 2N×N, 2N×½N) and a vertical directional TT (e.g., ½N×2N, N×2N, ½N×2N).

As an example, a block no more split in the QT structure B3 may be split into a vertical directional TT C0, C1 and C2 or a horizontal directional TT D0, D1 and D2. As shown in FIG. 11, the block C1 may be recursively split in a horizontal directional TT E0, E1 and E2 ora vertical directional TT F0, F1, and F2.

As another example, an AT may have four shapes of split structures including a horizontal-up AT (2N×½N, 2N×³⁄₂N), a horizontal-down AT (2N×³⁄₂N, 2N×½N), a vertical-left AT (½N×2N, ³⁄₂N×2N) and a vertical-right AT (³⁄₂N×2N, ½N×2N). Each of BT, TT and AT may be further recursively split by using BT, TT and AT.

FIG. 12 is a diagram illustrating a binary-tree and ternary-tree based block split structure as an embodiment to which the present disclosure may be applied.

Referring to FIG. 12, a processing block may be split by using BT and TT split structures together. For example, a sub-block split in the BT structure may be split in the TT structure. Alternatively, a sub-block split in the TT structure may be split in the BT structure.

In FIG. 12, a split denoted by a thin solid line represents a first split, and split denoted by a thick dotted line represents a second split performed in a sub-block which is generated in the first split.

Table 2 represents coding quadtree syntax structure, and Table 3 represents a syntax for a coding tree.

TABLE 2

| | Descriptor |
|---|---|
| coding_quadtree( x0, y0, log2CbSize, cqtDepth ) { | |
|   if ( x0 + ( 1 << log2CbSize ) <= | |
|     pic_width_in_luma_samples && | |
|     y0 + ( 1 << log2CbSize ) <= | |
|     pic_height_in_luma_samples && | |
|     log2CbSize > MinCbLog2SizeY ) | |
|   split_qt_flag[ x0 ][ y0 ] | ae(v) |
|   if ( split_cu_flag[ x0 ][ y0 ] ) { | |
|     x1 = x0 + ( 1 << ( log2CbSize − 1 ) ) | |
|     y1 = y0 + ( 1 << ( log2CbSize − 1 ) ) | |
|     coding_quadtree( x0, y0, log2CbSize −1, cqtDepth+1 ) | |
|     coding_quadtree( x1, y0, log2CbSize − 1, cqtDepth + 1 ) | |
|     coding_quadtree( x1, y0, log2CbSize − 1, cqtDepth + 1 ) | |
|     coding_quadtree( x1, y0, log2CbSize − 1, cqtDepth + 1 ) | |
|   } else { | |
|     coding_tree( x0, y0, log2CbSize, log2CbSize) | |
|   } | |
| } | |

Referring to Table 2, a decoding process for determining a quad-tree split structure is described. A coding quadtree syntax (or function) may be called with a top left coordinate (x0, y0) of a current block, a size (log 2CbSize) of the current block and a depth of a current quadtree split as inputs.

In the case that a current block does not exceed a width or a height of a current picture, and the current block is greater than a coding block of a minimum size, a decoder parses split_qt_flag syntax element. The split_qt_flag syntax element indicates whether the current block is split into four blocks in the quad-tree structure. For example, in the case that split_qt_flag value is 0, the case represents that the current block is not split into four blocks in the quad-tree structure, and in the case that split_qt_flag value is 1, the case represents that the current block is split into four blocks of a half of the width and a half of the height. x0 and y0 represents a top left position of a luma image.

As a result of parsing, in the case of being determined that the current block is split in the quad-tree structure, a decoder calls coding quadtree syntax (or function) again for 4 sub-blocks split from the current block.

As a result of parsing, in the case of not being determined that the current block is split in the quad-tree structure, a decoder calls coding quadtree syntax (or function) for the current block for determining a subsequent split structure (i.e., multi-type tree structure).

TABLE 3

| | Descriptor |
|---|---|
| coding_tree( x0, y0, log2CbSizeW, log2CbSizeH) { | |
|   if ( x0 + ( 1 << log2CbSize ) <= pic_width_in_luma_samples && | |
|     y0 + ( 1 << log2CbSize ) <= pic_height_in_luma_samples && | |
|     log2CbSize > MinBTTCbLog2SizeY ) | |
|     split_fur_flag[ x0 ][ y0 ] | ae(v) |
|   if ( split_fur_flag[ x0 ][ y0 ] ) { | |
|     split_bt_flag[ x0 ][ y0 ] | ae(v) |

TABLE 3-continued

|  | Descriptor |
|---|---|
| split_dir[ x0 ][ y0 ] | ae(v) |

```
    }
    if( SplitMode == PART_BT_HOR) {
        coding_tree ( x0, y0, log2CbSizeW, log2CbSizeH - 1 )
        coding_ tree ( x0, y0 + (1 << ( log2CbSizeH - 1 )), log2CbSizeW, log2CbSizeH - 1)
    } else if ( SplitMode == PART_BT_VER) {
        coding_tree ( x0, y0, log2CbSizeW - 1, log2CbSizeH)
        coding_tree ( x0 + (1 << ( log2CbSizeW - 1 )), y0, log2CbSizeW - 1, log2CbSizeH)
    } else if ( SplitMode == PART_TT_HOR) {
        coding_tree ( x0, y0, log2CbSizeW, log2CbSizeH - 2 )
        coding_tree ( x0, y0 + (1 << ( log2CbSizeH - 2 )), log2CbSizeW, log2CbSizeH - 1)
        coding_tree ( x0, y0 + (1 << ( log2CbSizeH - 2 ) + (1 << ( log2CbSizeH - 1 )),
log2CbSizeW, log2CbSizeH - 2)
    } else if ( SplitMode == PART_TT_VER) {
        coding_tree ( x0, y0, log2CbSizeW - 2, log2CbSizeH)
        coding_tree ( x0 + (1 << ( log2CbSizeW - 2 )), y0, log2CbSizeW - 1, log2CbSizeH)
        coding_tree ( x0 + (1 << ( log2CbSizeW - 2 ) + (1 << ( log2CbSizeW - 1 )), y0,
log2CbSizeW - 2, log2CbSizeH)
    }
} else {
    coding_unit(x0, y0, log2CbSizeW, log2CbSizeH)
}
}
```

Referring to Table 3, a decoding process for determining an additional split structure in a quad-tree leaf node block is described. A coding quadtree syntax (or function) may be called with a top left coordinate (x0, y0) of a current block, a width (log 2CbSize) of the current block and a width (log 2CbSizeH) of the current block as an input.

In the case that a current block does not exceed a width or a height of a current picture, and the current block is greater than an MTT block of a minimum size, a decoder parses split_fur_flag syntax element. The split_fur_flag syntax element indicates whether the current block is further split. For example, in the case that split_fur flag value is 0, the case represents that the current block is no more split, and in the case that split_fur_flag value is 1, the case represents that the current block is split.

As a result of parsing, in the case of being determined that the current block is further split, a decoder calls split_bt_flag and split_dir syntax element (or function). The split_bt_flag syntax represents whether the current block is split in the BT structure or the TT structure. For example, in the case that the split_bt_flag value is 1, the case represents that the block is split in the BT, and in the case that the split_bt_flag value is 0, the case represents that the block is split in TT.

A split type (SplitType) of the current block may be determined as represented in Table 4 below based on the split_fur_flag syntax and the split_bt_flag syntax.

TABLE 4

| split_fur_flag | split_bt_flag | SplitType |
|---|---|---|
| 0 |  | NO_SPLIT |
| 1 | 1 | BT |
| 1 | 0 | TT |

In addition, in Table 3, the split_dir syntax element represents a split direction. For example, in the case that the split_dir value is 0, the case represents that a block is split in a horizontal direction, and in the case that the split_dir value is 1, the case represents that a block is split in a vertical direction.

The final block split mode (SplitMode) which is MTT split from a current block may be induced as represented in Table 5 below.

TABLE 5

| SplitType | split_dir | SplitMode |
|---|---|---|
| BT | 0 | PART_BT_HOR |
|  | 1 | PART_BT_VER |
| TT | 0 | PART_TT_HOR |
|  | 1 | PART_TT_VER |

A decoder calls the coding tree syntax (or function) again for the sub-block split according to the finally determined split structure.

Embodiment 7

In an embodiment of the present disclosure, after split in a multi-type tree (i.e., BT, TT) structure, it is proposed a method for supporting QT split during the split. As an embodiment, as represented in Table 6 below, the support of QT split after BT and TT splits are performed may be selectively used through a flag signaling in a sequence parameter set (SPS).

TABLE 6

|  | Descriptor |
|---|---|
| sequence_parameter_set( ) { |  |
| ... |  |
| nesting_split_qt_enable_flag | u(1) |
| } |  |

Referring to Table 6, the nesting_split_qt_enable_flag syntax element represents whether to transmit split_qt_flag for QT split in a lower level syntax (e.g., coding tree) after QT split. For example, in the case that the nesting_split_qt_enable_flag value is 0, split_qt_flag is not transmitted in a coding tree unit. In the case that the nesting_split_qt_enable_flag value is 1, split_qt_flag may be transmitted in a coding tree unit.

Table 6 described above is just an example, but the present disclosure is not limited thereto. The nesting_split_qt_enable_flag syntax may be signaled by using a picture parameter set (PPS), a slice header (or tile group header) or the other network abstract layer (NAL) as well as an SPS.

Table 7 below represents a syntax structure for a coding tree according to an embodiment of the present disclosure.

TABLE 7

| | Descriptor |
|---|---|
| coding_tree( x0, y0, log2CbSizeW, log2CbSizeH ) { | |
|   if ( x0 + ( 1 << log2CbSize ) <= pic_width_in_luma_samples && | |
|       y0 + ( 1 << log2CbSize ) <= pic_height_in_luma_samples && | |
|       log2CbSize > MinBTTCbLog2SizeY ) | |
|     if ( nesting_split_qt_enable_flag && bttDepth > 0 && log2CbSizeW == log2CbSizeH) | |
|       nesting_split_qt_flag[ x0 ][ y0 ] | ae(v) |
|     if ( !nesting_split_qt_flag[ x0 ][ y0 ] ) { | |
|     split_fur_flag[ x0 ][ y0 ] | ae(v) |
|     if ( split_fur_flag[ x0 ][ y0 ] ) { | |
|     split_bt_flag[ x0 ][ y0 ] | ae(v) |
|     split_dir[ x0 ][ y0 ] | ae(v) |
|     } | |
|   } | |
|   if( SplitMode == PART_BT_HOR) { | |
|    coding_tree ( x0, y0, log2CbSizeW, log2CbSizeH - 1 ) | |
|    coding_ tree ( x0, y0 + (1 << ( log2CbSizeH - 1 )), log2CbSizeW, log2CbSizeH - 1) | |
|   } else if ( SplitMode == PART_BT_VER) { | |
|    coding_tree ( x0, y0, log2CbSizeW - 1, log2CbSizeH) | |
|    coding_tree ( x0 + (1 << ( log2CbSizeW - 1 )), y0, log2CbSizeW - 1, log2CbSizeH) | |
|   } else if ( SplitMode == PART_TT_HOR) { | |
|    coding_tree ( x0, y0, log2CbSizeW, log2CbSizeH - 2 ) | |
|    coding_tree ( x0, y0 + (1 << ( log2CbSizeH - 2 )), log2CbSizeW, log2CbSizeH - 1) | |
|    coding_tree ( x0, y0 + (1 << ( log2CbSizeH - 2 ) + (1 << ( log2CbSizeH - 1 )), log2CbSizeW, log2CbSizeH - 2) | |
|   } else if ( SplitMode == PART_TT_VER) { | |
|    coding_tree ( x0, y0, log2CbSizeW - 2, log2CbSizeH) | |
|    coding_tree ( x0 + (1 << ( log2CbSizeW - 2 )), y0, log2CbSizeW - 1, log2CbSizeH) | |
|    coding_tree ( x0 + (1 << ( log2CbSizeW - 2 ) + (1 << ( log2CbSizeW - 1 )), y0, log2CbSizeW - 2, log2CbSizeH) | |
|   } else if ( SplitMode == PART_QT) { | |
|    coding_tree ( x0, y0, log2CbSizeW - 1, log2CbSizeH - 1) | |
|    coding_tree ( x0 + (1 << ( log2CbSizeW - 1 )), y0, log2CbSizeW - 1, log2CbSizeH - 1) | |
|    coding_tree ( x0, y0 + (1 << ( log2CbSizeH - 1 )), log2CbSizeW - 1, log2CbSizeH - 1) | |
|    coding_tree ( x0 + (1 << ( log2CbSizeW - 1 )), y0 + (1 << ( log2CbSizeH - 1 )), log2CbSizeW - 1, log2CbSizeH - 1) | |
|   } else { | |
|    coding_unit(x0, y0, log2CbSizeW, log2CbSizeH) | |
|   } | |
| } | |

Referring to Table 7, a coding tree syntax (or function) may be called with a top left coordinate (x0, y0) of a current block, a width (log 2CbSizeW) of the current block and a width (log 2CbSizeH) of the current block as inputs.

A decoder checks whether the current block does not exceed a width or height of the current picture and the current block is greater than a BTT block (or MTT block) of a minimum size.

In the case that the current block does not exceed a width or height of the current picture and the current block is greater than a BTT block of a minimum size, when the nesting_split_qt_enable_flag parsed from a higher level syntax is 1, bttDepth is greater than 0, and a width and a height of the block are equal, a decoder may parse the nesting_split_qt_flag.

Here, bttDepth may mean a depth of a block split in BT or TT and may be calculated as a ratio of a size of the current block based on a width and a height of the block in which BT or TT split is started. The nesting_split_qt_flag syntax represents whether a current encoding block is split into four blocks in QT shape. For example, in the case that the nesting_split_qt_flag value is 0, the case represents that the current block is not split, and in the case that the nesting_split_qt_flag value is 1, the case represents that the current block is split into four blocks of a half of the width and a half of the height.

In the case that the nesting_split_qt_flag is not shown in a bitstream, it is induced to 0. Later, in the case that the nesting_split_qt_flag value is 0, a decoder parses the split_fur_flag. In addition, in the case that it is identified that the current block is additionally split depending on the split_fur flag value, the decoder parses the split_bt_flag and the split_dir syntax elements.

The split_fur_flag syntax represents whether the current encoding block is additionally split. For example, in the case that the split_fur flag value is 0, the case represents that the block is no more split, and in the case that the split_fur_flag value is 1, the case represents that the block is split.

The split_bt_flag syntax represents whether the block is split in BT or TT structure. For example, in the case that the split_bt_flag value is 1, the case represents that the block is split in BT, and in the case that the split_bt_flag value is 0, the case represents that the block is split in TT. The split type (SplitType) of the current block may be determined as represented in Table 8 below based on the split_fur flag syntax and the split_bt_flag syntax.

TABLE 8

| nesting_split_qt_flag | split_fur_flag | split_bt_flag | SplitType |
|---|---|---|---|
| 0 | 0 |  | NO_SPLIT |
| 0 | 1 | 1 | BT |
| 0 | 1 | 0 | TT |
| 1 |  |  | QT |

In addition, in Table 7, the split_dir syntax element represents a split direction. For example, in the case that the split_dir value is 0, the case represents that a block is split in a horizontal direction, and in the case that the split_dir value is 1, the case represents that a block is split in a vertical direction.

The final block split mode (SplitMode) which is MTT split from a current block may be induced as represented in Table 9 below.

TABLE 9

| SplitType | split_dir | SplitMode |
|---|---|---|
| BT | 0 | PART_BT_HOR |
|  | 1 | PART_BT_VER |
| TT | 0 | PART_TT_HOR |
|  | 1 | PART_TT_VER |
| QT |  | PART_QT |

A decoder calls the coding tree syntax (or function) again for the sub-block split according to the finally determined split structure.

Embodiment 8

FIGS. 13A and 13B are diagrams illustrating a method for splitting a block based on a stripe tree structure as an embodiment to which the present disclosure may be applied.

In the hardware aspect of an encoder and a decoder, a split in a square shape may be more efficient than a split in a non-square split. In the case that a width and a height are significantly different in the case of a non-square block, it may be more efficient to split the non-square block into square blocks again. Accordingly, in an embodiment of the present disclosure, it is proposed a stripe tree (ST) block split structure for splitting a non-square block into four blocks of the same size.

Particularly, as shown in FIGS. 13A and 13B, an encoder/decoder may split a non-square block into four blocks of the same size in a vertical direction (FIG. 13A) or a vertical direction (FIG. 13B) in the ST structure.

As an embodiment, as represented in Table 10 below, a support of the ST split may be selectively used through a flag signaling in a sequence parameter set (SPS).

TABLE 10

|  | Descriptor |
|---|---|
| sequence_parameter_self( ) { | |
| ... | |
| split_st_enable_flag | u(1) |
| } | |

Referring to Table 10, the split_st_enable_flag syntax element represents whether to transmit split_st_flag for ST split in a lower level syntax (e.g., coding tree). For example, in the case that the split_st_enable_flag value is 0, split_st_flag is not transmitted in a coding tree unit. In the case that the split_st_enable_flag value is 1, split_st_flag may be transmitted in a coding tree unit.

Table 10 described above is just an example, but the present disclosure is not limited thereto. The split_st_enable_flag syntax may be signaled by using a picture parameter set (PPS), a slice header (or tile group header) or the other network abstract layer (NAL) as well as an SPS.

Table 11 below represents a syntax structure for a coding tree according to an embodiment of the present disclosure.

TABLE 11

|  | Descriptor |
|---|---|
| coding_tree( x0, y0, log2CbSizeW, log2CbSizeH) { | |
|     if ( x0 + ( 1 << log2CbSize ) <= pic_width_in_luma_samples && | |
|         y0 + ( 1 << log2CbSize ) <= pic_height_in_luma_samples && | |
|         log2CbSize > MinBTTCbLog2SizeY ) | |
|     if (split_st_enable_flag && | |
|         ((log2CbSizeW == (log2CbSizeH << 2)) \|\| (((log2CbSizeW <<2) == log2CbSizeH)) | |
|         split_st_flag[ x0 ][ y0 ] | ae(v) |
|     if ( !split_st_flag[ x0 ][ y0 ] ) { | |
|         split_fur_flag[ x0 ][ y0 ] | ae(v) |
|     if ( split_fur_flag[ x0 ][ y0 ] ) { | |
|         split_bt_flag[ x0 ][ y0 ] | ae(v) |
|         split_dir[ x0 ][ y0 ] | ae(v) |
|     } | |
| } | |
| if( SplitMode == PART_BT_HOR) { | |
|  coding_tree ( x0, y0, log2CbSizeW, log2CbSizeH − 1 ) | |
|  coding_tree ( x0, y0 + (1 << ( log2CbSizeH − 1 )), log2CbSizeW, log2CbSizeH − 1) | |
| } else if ( SplitMode == PART_BT_VER) { | |
|  coding_tree ( x0, y0, log2CbSizeW − 1, log2CbSizeH) | |
|  coding_tree ( x0 + (1 << ( log2CbSizeW − 1 )), y0, log2CbSizeW − 1, log2CbSizeH) | |
| } else if ( SplitMode == PART_TT_HOR) { | |
|  coding_tree ( x0, y0, log2CbSizeW, log2CbSizeH − 1) | |
|  coding_tree ( x0, y0 + (1 << ( log2CbSizeH − 2 )), log2CbSizeW, log2CbSizeH − 1) | |
|  coding_tree ( x0, y0 + (1 << ( log2CbSizeH − 2 ) + (1 << ( log2CbSizeH − 1 )), log2CbSizeW, log2CbSizeH − 1) | |
| } else if ( SplitMode == PART_TT_VER) { | |
|  coding_tree ( x0, y0, log2CbSizeW − 1, log2CbSizeH) | |
|  coding_tree ( x0 + (1 << ( log2CbSizeW − 2 )), y0, log2CbSizeW − 1, log2CbSizeH) | |
|  coding_tree ( x0 + (1 << ( log2CbSizeW − 2 ) + (1 << ( log2CbSizeW − 1 )), y0, log2CbSizeW − 1, log2CbSizeH) | |
| } else if ( SplitMode == PART_ST) { | |
|   if (log2CbSizeW > log2CbSizeH ) { | |
|     coding_tree ( x0, y0, log2CbSizeW − 2, log2CbSizeH) | |
|     coding_tree ( x0 + (1 << ( log2CbSizeW − 2 )), y0, log2CbSizeW − 2, log2CbSizeH) | |
|     coding_tree ( x0 + (1 << ( log2CbSizeW − 1 )), y0, log2CbSizeW − 2, log2CbSizeH) | |
|     coding_tree ( x0 + (1 << ( log2CbSizeW − 1 )) + (1 << ( log2CbSizeW − 2 )), y0, | |

TABLE 11-continued

|  | Descriptor |
|---|---|
| log2CbSizeW − 2, log2CbSizeH) <br>     } else { <br>      coding_tree ( x0, y0, log2CbSizeW, log2CbSizeH − 2) <br>      coding_tree ( x0, y0 + (1 << ( log2CbSizeH − 2 )), log2CbSizeW, log2CbSizeH − 2) <br>      coding_tree ( x0, y0 + (1 << ( log2CbSizeH − 1 )), log2CbSizeW, log2CbSizeH − 2) <br>      coding_tree ( x0, y0 + (1 << ( log2CbSizeH − 1 )), log2CbSizeW, log2CbSizeH − 2) <br>      coding_tree ( x0, y0 + (1 << ( log2CbSizeH − 1 )), log2CbSizeW, log2CbSizeH − 2) <br>     } <br>   } else { <br>    coding_unit(x0, y0, log2CbSizeW, log2CbSizeH) <br>   } <br> } |  |

Referring to Table 11, a coding tree syntax (or function) may be called with a top left coordinate (x0, y0) of a current block, a width (log 2CbSizeW) of the current block and a width (log 2CbSizeH) of the current block as inputs. The description overlapped with Table 7 described above is omitted A decoder parses the split_st_flag in the case that the split_st_enable_flag value parsed in a higher level syntax is 1, and a width of a current block is four times greater than a height or a height of a current block is four times greater than a width. Here, the split_st_flag syntax element represents whether a current encoding block is split into four blocks in ST shape.

For example, in the case that the split_st_flag value is 0, the case means that a block is not split, and in the case that the split_st_flag value is 1, the case means that a block is split into four blocks of the same size in a horizontal or vertical direction. In the case that the split_st_flag is not shown in a bitstream, it may be induced to 0. Later, split_fur_flag, split_bt_flag, and split_dir syntaxes may be transmitted when the split_st_flag value is 0.

The split_fur flag syntax represents that a current encoding block is additionally split. For example, in the case that the split_fur flag value is 0, the case means that the block is no more split, and in the case that the split_fur flag value is 1, the case means that the block is split.

A split type (SplitType) of a current block may be determined as represented in Table 12 below based on the split_fur_flag syntax and the split_bt_flag syntax.

TABLE 12

| split_st_flag | split_fur_flag | split_bt_flag | SplitType |
|---|---|---|---|
| 0 | 0 |  | NO_SPLIT |
| 0 | 1 | 1 | BT |
| 0 | 1 | 0 | TT |
| 1 |  |  | ST |

In addition, in Table 11, the split_dir syntax element represents a split direction. For example, in the case that the split_dir value is 0, the case represents that a block is split in a horizontal direction, and in the case that the split_dir value is 1, the case represents that a block is split in a vertical direction.

The final block split mode (SplitMode) which is MTT split from a current block may be induced as represented in Table 13 below.

TABLE 13

| SplitType | split_dir | SplitMode |
|---|---|---|
| BT | 0 | PART_BT_HOR |
|  | 1 | PART_BT_VER |
| TT | 0 | PART_TT_HOR |
|  | 1 | PART_TT_VER |
| ST |  | PART_ST |

In addition, in an embodiment, the split_st_flag syntax element described above may be located after the split_fur_flag syntax, as represented in Table 14 below.

TABLE 14

|  | Descriptor |
|---|---|
| coding_tree( x0, y0, log2CbSizeW, log2CbSizeH) { <br>  if ( x0 + ( 1 << log2CbSize ) <= pic_width_in_luma_samples && <br>    y0 + ( 1 << log2CbSize ) <= pic_height_in_luma_samples && <br>    log2CbSize > MinBTTCbLog2SizeY ) <br>   split_fur_flag[ x0 ][ y0 ] <br>   if ( split_fur_flag[ x0 ][ y0 ] ) { <br>    if (split_st_enable_flag && <br>     ((log2CbSizeW == (log2CbSizeH << 2)) || (((log2CbSizeW <<2) == <br>     log2CbSizeH)) <br>    split_st_flag[ x0 ][ y0 ] <br>    if ( !split_st_flag[ x0 ][ y0 ] ) { <br>     split_bt_flag[ x0 ][ y0 ] <br>     split_dir[ x0 ][ y0 ] <br>    } <br>   } <br> ... | <br><br><br><br>ae(v)<br><br><br><br><br>ae(v)<br><br>ae(v)<br>ae(v) |

Referring to Table 14, in the case that a current block is further split according to the split_fur_flag, a decoder may parse the split_st_flag in the case that the split_st_enable_flag value parsed in a higher level syntax is 1, and a width of a current block is four times greater than a height or a height of a current block is four times greater than a width.

In addition, in Table 11 and Table 14 above, the split_st_flag is transmitted (or parsed) by assuming that a difference between a width and a height is 4 times in ST, but the present disclosure is not limited thereto, but the split_st_flag may be transmitted (or parsed) in the case that a difference between a width and a height is one time (same size), two times, eight times or sixteen times. Alternatively, the split_st_flag may be transmitted by configuring a combination of two or three ratios. Alternatively, the split_st_flag may be transmitted in the case of a predetermined block ratio or more.

Furthermore, the split_st_flag may be used together with the nesting_split_qt_flag described in embodiment 7. The syntax structure in the case that two syntax elements are used together may be represented in Table 15 below.

TABLE 15

| | Descriptor |
|---|---|
| coding_tree( x0, y0, log2CbSizeW, log2CbSizeH ) { | |
|   if ( x0 + ( 1 << log2CbSize ) <= pic_width_in_luma_samples && | |
|     y0 + ( 1 << log2CbSize ) <= pic_height_in_luma_samples && | |
|     log2CbSize > MinBTTCbLog2SizeY ) | |
|     if ( nesting_split_qt_enable_flag && bttDepth > 0 && log2CbSizeW == log2CbSizeH) | |
|       nesting_split_qt_flag[ x0 ][ y0 ] | ae(v) |
|     if ( !nesting_split_qt_flag[ x0 ][ y0 ] ) { | |
|       split_fur_flag[ x0 ][ y0 ] | ae(v) |
|       if ( split_fur_flag[ x0 ][ y0 ] ) { | |
|         if (split_st_enable_flag && | |
|         ((log2CbSizeW == (log2CbSizeH << 2)) || (((log2CbSizeW <<2) == | |
|         log2CbSizeH)) | |
|         split_st_flag[ x0 ][ y0 ] | ae(v) |
|         if ( !split_st_flag[ x0 ][ y0 ] ) { | |
|           split_bt_flag[ x0 ][ y0 ] | ae(v) |
|           split_dir[ x0 ][ y0 ] | ae(v) |
|         } | |
|       } | |
|     } | |
| ... | |

Referring to Table 15, it may be identified whether qt split is performed by parsing the nesting_split_qt_flag, and whether a current block is split by parsing the split_fur_flag. In the case that the current block is further split according to the split_fur_flag, a decoder may parse the split_st_flag in the case that the split_st_enable_flag value parsed in a higher level syntax is 1, a width of a current block is four times greater than a height or a height of a current block is four times greater than a width.

Embodiment 9

In an embodiment of the present disclosure, it is proposed a method for transmitting split structures of QT, BT and TT in the same syntax structure (i.e., syntax of the same level). In this embodiment, without regard to whether a block is a square block or a non-square block, an encoder/decoder may perform QT structure split from a most higher node (e.g., CTU). In addition, without regard to whether BT and TT structures is a leaf node of QT split, split from a most higher node is also available. Table 16 represents a syntax for coding quadtree according to an embodiment of the present disclosure.

TABLE 16

| | Descriptor |
|---|---|
| coding_quadtree( x0, y0, log2CbSize, cqtDepth ) { | |
|   if ( x0 + ( 1 << log2CbSize ) <= pic_width_in_luma_samples && | |
|     y0 + ( 1 << log2CbSize ) <= pic_height_in_luma_samples && | |
|     log2CbSize > MinCbLog2SizeY ) | |
|     split_fur_flag[ x0 ][ y0 ] | ae(v) |
|     if ( split_fur_flag[ x0 ][ y0 ] ) { | |
|       split_qt_flag[ x0 ][ y0 ] | ae(v) |
|       if ( !split_qt_flag[ x0 ][ y0 ]) { | |

TABLE 16-continued

|  | Descriptor |
|---|---|
| split_bt_flag[ x0 ][ y0 ] | ae(v) |
| split_dir[ x0 ][ y0 ] | ae(v) |

```
        }
     }
   if( SplitMode == PART_BT_HOR) {
      coding_quadtree ( x0, y0, log2CbSizeW, log2CbSizeH − 1 )
      coding_quadtree ( x0, y0 + (1 << ( log2CbSizeH − 1 )), log2CbSizeW, log2CbSizeH − 1)
   } else if ( SplitMode == PART_BT_VER) {
      coding_quadtree ( x0, y0, log2CbSizeW − 1, log2CbSizeH)
      coding_quadtree ( x0 + (1 << ( log2CbSizeW − 1 )), y0, log2CbSizeW − 1, log2CbSizeH)
   } else if ( SplitMode == PART_TT_HOR) {
      coding_quadtree ( x0, y0, log2CbSizeW, log2CbSizeH − 2 )
      coding_quadtree ( x0, y0 + (1 << ( log2CbSizeH − 2 )), log2CbSizeW, log2CbSizeH − 1)
      coding_quadtree ( x0, y0 + (1 << ( log2CbSizeH − 2 ) + (1 << ( log2CbSizeH − 1 )),
log2CbSizeW, log2CbSizeH − 2)
   } else if ( SplitMode == PART_TT_VER) {
      coding_quadtree ( x0, y0, log2CbSizeW − 2, log2CbSizeH)
      coding_quadtree ( x0 + (1 << ( log2CbSizeW − 2 )), y0, log2CbSizeW − 1, log2CbSizeH)
      coding_quadtree ( x0 + (1 << ( log2CbSizeW − 2 ) + (1 << ( log2CbSizeW − 1 )), y0,
log2CbSizeW − 2, log2CbSizeH)
   } else if ( SplitMode == PART_QT) {
      coding_quadtree ( x0, y0, log2CbSizeW − 1, log2CbSizeH − 1)
      coding_quadtree ( x0 + (1 << ( log2CbSizeW − 1 )), y0, log2CbSizeW − 1, log2CbSizeH −
1)
      coding_quadtree ( x0, y0 + (1 << (log2CbSizeH − 1 )), log2CbSizeW − 1, log2CbSizeH −
1)
      coding_quadtree ( x0 + (1 << ( log2CbSizeW − 1 )), y0 + (1 << ( log2CbSizeH − 1 )),
log2CbSizeW − 1, log2CbSizeH − 1)
   } else {
      coding_unit(x0, y0, log2CbSizeW, log2CbSizeH)
   }
}
```

Referring to Table 16, a coding quadtree syntax (or function) may be called with a top left coordinate (x0, y0) of a current block, a size (log 2CbSize) of the current block and a depth of a current quadtree split as inputs.

In the case that a current block does not exceed a width or a height of a current picture, and the current block is greater than a coding block of a minimum size, a decoder parses split_fur_flag syntax element. Here, the split_fur_flag syntax element indicates whether the current block is split into four blocks in the quad-tree structure.

For example, in the case that split_fur_flag value is 0, the case represents that the current block is not split into four blocks in the quad-tree structure, and in the case that the split_fur_flag value is 1, the case represents that the current block is split into blocks of lower depth. That is, in this embodiment, and in the case that the split_fur_flag value is 1, the split_qt_flag syntax element may be transmitted.

That is, a decoder identifies the split_fur_flag value, and in the case that the value is 1, the decoder parses the split_qt_flag syntax element. Here, the split_st_flag syntax element represents whether a current block is split into four blocks in the QT structure. In the case that the current block is additionally split, the decoder may check whether the current block is split in the QT structure, first. For example, in the case that the split_qt_flag value is 0, the case represents that the block is not split in the QT structure, and in the case that the split_qt_flag value is 1, the case represents that the block is split into four blocks including a half of a width and a half of a height. In this embodiment, in the case that the split_qt_flag value is 0, split_bt_flag may be transmitted. In other words, in the case that the current block is not split in the QT structure, the decoder may identify whether the current block is split in MTT structure.

That is, in the case that the split_qt_flag value is 0, decoder may parse the split_bt_flag and/or split_dir syntax element. Here, the split_bt_flag syntax element represents whether the block is split in a multi-type tree structure (i.e., BT or TT). For example, in the case that the split_bt_flag value is 1, the case represents that the block is split in BT, and in the case that the split_bt_flag value is 0, the case represents that the block is split in TT. Alternatively, in the case that the split_bt_flag value is 0, the case represents that the block is split in BT, and in the case that the split_bt_flag value is 1, the case represents that the block is split in TT.

A split type (SplitType) of a current block may be determined as represented in Table 17 below based on the split_fur_flag, split_qt_flag and the split_bt_flag syntax elements.

TABLE 17

| split_fur_flag | split_qt_flag | split_bt_flag | SplitType |
|---|---|---|---|
| 0 |  |  | NO_SPLIT |
| 1 | 1 |  | QT |
| 1 | 0 | 1 | BT |
| 1 | 0 | 0 | TT |

Hereinafter, an embodiment associated with the description described in embodiment 4 above is described.

In an embodiment, the TT block size parameter (TTbLog 2SizeY) described in embodiment 4 above may be used in the process of inducing an intra prediction mode when performing an intra prediction. Particularly, the TT block size variable (TTbLog 2SizeY) may be used in the process that a candidate intra prediction mode is induced.

For example, in the case that a prediction block is present in a topmost side of a TT block, a candidate intra prediction mode of an upper neighboring block may be set to INTRA_DC. A more specific embodiment may be as below, but the present disclosure is not limited thereto.

FIG. 14 is a diagram illustrating a reference position of a current block and a neighboring block as an embodiment to which the present disclosure may be applied.

Referring to FIG. 14, (xPb, yPb) indicates a position of a prediction block, (xNbB, yNbB) indicates a position of a sample adjacent to an upper side, and (xNbA, yNbA) indicates a position of a sample adjacent to a left side. (xNbA, yNbA) may be set to (xPb−1, yPb), and (xNbB, yNbB) may be set to (xPb, yPb−1).

In order to induce a candidate intra prediction mode, an encoder/decoder may check whether a left neighboring block and an upper neighboring block are usable (referred to as a first condition). In the case that the left neighboring block and the upper neighboring block are unusable, the candidate intra prediction mode (candIntraPredModeX) (X=A, B) may be set to INTRA_DC.

In the case that not all of the left neighboring block and the upper neighboring block are unusable, the encoder/decoder may check whether the left neighboring block or the upper neighboring block is an inter mode or PCM mode (referred to as a second condition). In the case that the left neighboring block or the upper neighboring block is not an intra prediction mode or PCM flag is 1 (i.e., the case of PCM coded), the encoder/decoder may set the candidate intra prediction mode (candIntraPredModeX) (X=A, B) to INTRA_DC.

When the first condition and the second condition are not satisfied, in the case that a prediction block is present in topmost side of a TT block, the candidate intra prediction mode of the upper neighboring block may be set to INTRA_DC.

As described above, a candidate intra prediction mode may be induced based on the TT block size variable (TTbLog 2SizeY), and the candidate intra prediction mode may be used for inducing an intra prediction mode of a current block. A prediction block is generated based on the induced intra prediction mode, and the decoder may reconstruct a video signal by adding a residual block and the prediction block.

As another embodiment, the TT block size variable (TTbLog 2SizeY) may be used in the process of predicting a temporal motion vector in inter prediction. For example, the TT block size variable (TTbLog 2SizeY) may be used in the process of inducing a collocated motion vector of a lower right block.

Particularly, based on the TT block size variable (TTbLog 2SizeY), a collocated motion vector of a lower right block may be induced, and the collocated motion vector of the lower right block may be used for generating a motion vector prediction value of a current prediction block.

The encoder/decoder may generate a motion vector by adding the motion vector prediction value and a motion vector difference value and generate an inter prediction block by using the motion vector. The decoder may reconstruct a video signal by adding a residual block and the prediction block.

As another embodiment, the TT block size variable (TTbLog 2SizeY) may be used in the process of inducing a quantization parameter. For example, the TT block size variable (TTbLog 2SizeY) may be used in the process of inducing a quantization parameter of the left neighboring block or the upper neighboring block.

As another embodiment, the TT block size variable (TTbLog 2SizeY) may be used in the process of performing SAO (Sample Adaptive Offset).

In addition, in Table 16, the split_dir syntax element represents a split direction. For example, in the case that the split_dir value is 0, the case represents that a block is split in a horizontal direction, and in the case that the split_dir value is 1, the case represents that a block is split in a vertical direction.

The final block split mode (SplitMode) which is MTT split from a current block may be induced as represented in Table 18 below.

TABLE 18

| SplitType | split_dir | SplitMode |
|---|---|---|
| BT | 0 | PART_BT_HOR |
|  | 1 | PART_BT_VER |
| TT | 0 | PART_TT_HOR |
|  | 1 | PART_TT_VER |
| QT |  | PART_QT |

A decoder calls the coding quadtree syntax (or function) again for the sub-block split according to the finally determined split structure.

In the embodiments of the present disclosure, in describing a method that split structures of QT, BT and TT are transmitted in the same syntax structure (i.e., syntax of the same level), for the convenience of description, it is mainly described the case that the split structures of QT, BT and TT are transmitted in coding quadtree syntax, but the present disclosure is not limited thereto. For example, the split structures of QT, BT and TT are transmitted in coding tree syntax.

So far, the embodiments of the present disclosure are separately described for each of the embodiments for the convenience of description, but the present disclosure is not limited thereto. In other words, embodiments 1 to 9 described above may be separately performed, or one or more embodiments may be performed in combination.

FIG. 15 is a flowchart illustrating a decoding method of a video signal according to an embodiment to which the present disclosure is applied.

Referring to FIG. 15, a decoder is mainly described for the convenience of description, but the present disclosure is not limited thereto. A decoding method of a video signal according to an embodiment of the present disclosure may be performed in an encoder and a decoder in the same way.

In the case that a current block satisfies a preconfigured condition, a decoder parses a first syntax element indicating whether the current block is split into a plurality of sub-blocks (step, S1501).

As described in embodiments 6 to 9 described above, in the case that the first syntax element value is 0, the current block may not be split, and in the case that the first syntax element value is 1, the current block may be split into four sub-blocks using the quad-tree structure, may be split into two sub-blocks using the binary-tree structure, or may be split into three sub-blocks using the ternary-tree structure.

Furthermore, as described in the examples of Tables 2, 3, 7, 11, 14, 15 and 16 above, the preconfigured condition may be satisfied in the case that a value of a horizontal direction coordinate of a top left sample of the current block added by a width of the current block is equal to or smaller than the width of a current picture, and in the case that a value of a vertical direction coordinate of the top left sample of the current block added by a height of the current block is equal to or smaller than the height of the current picture.

Furthermore, as described above, the decoder may call a coding tree unit syntax for determining a split structure of the current block. In this case, the step of a coding tree unit syntax for the current block may be performed before step S1501.

In the case that the first syntax element indicates that the current block is split, the decoder parses a second syntax element indicating whether the current block is split using a quad-tree structure (step, S1502).

As described in embodiments 1 to 9 described above, in the case that the first syntax element indicates that the current block is not split, the decoder may call a coding unit syntax for the decoding process of the current block.

In the case that the second syntax element indicates that the current block is not split using the quad-tree structure, the decoder parses at least one of a third syntax element indicating whether the current block is split using a binary-tree structure or a ternary-tree structure and a fourth syntax element indicating a split direction of the current block (step, S1503).

The decoder determines a split mode (or a split type) of the current block based on at least one of the first syntax element, the second syntax element, the third syntax element and the fourth syntax element (step, S1504). As an example, the split type may be determined as in Table 4, 5, 8, 9, 12, 13 and 17 described above according to the first syntax element, the second syntax element, the third syntax element and the fourth syntax element.

Furthermore, as described in embodiments 6 to 9 described above, the decoder may call a coding tree unit syntax for determining a split structure of the sub-block split from the current block based on the split mode.

Furthermore, as described in embodiment 9 described above, the first syntax element, the second syntax element, the third syntax element and the fourth syntax element may be parsed from a syntax of the same level.

Furthermore, as described in embodiment 7 described above, the decoder may parse a fifth syntax element indicating whether the current block split from a block of higher node using the binary-tree structure or the ternary-tree structure is split using the quad-tree structure.

FIG. 16 is a flowchart illustrating a decoding apparatus of a video signal according to an embodiment to which the present disclosure is applied.

In FIG. 16, for the convenience of description, a decoding apparatus is depicted in a single block, but the decoding apparatus shown in FIG. 16 may be implemented as a component included in an encoder and/or decoder.

Referring to FIG. 16, the decoding apparatus implements the function, process and/or method proposed in FIG. 1 to FIG. 15 above. Particularly, the decoding apparatus may include a syntax element parsing unit 1601 and a split mode determination unit 1602. In addition, in an embodiment, the syntax element parsing unit 1601 may be a component included in the split mode determination unit 1602.

In the case that a current block satisfies a preconfigured condition, the syntax element parsing unit 1601 parses a first syntax element indicating whether the current block is split into a plurality of sub-blocks.

As described in embodiments 6 to 9 described above, in the case that the first syntax element value is 0, the current block may not be split, and in the case that the first syntax element value is 1, the current block may be split into four sub-blocks using the quad-tree structure, may be split into two sub-blocks using the binary-tree structure, or may be split into three sub-blocks using the ternary-tree structure.

Furthermore, as described in the examples of Tables 2, 3, 7, 11, 14, 15 and 16 above, the preconfigured condition may be satisfied in the case that a value of a horizontal direction coordinate of a top left sample of the current block added by a width of the current block is equal to or smaller than the width of a current picture, and in the case that a value of a vertical direction coordinate of the top left sample of the current block added by a height of the current block is equal to or smaller than the height of the current picture.

Furthermore, as described above, the syntax element parsing unit 1601 may call a coding tree unit syntax for determining a split structure of the current block.

In the case that the first syntax element indicates that the current block is split, the syntax element parsing unit 1601 parses a second syntax element indicating whether the current block is split using a quad-tree structure.

As described in embodiments 1 to 9 described above, in the case that the first syntax element indicates that the current block is not split, the syntax element parsing unit 1601 may call a coding unit syntax for the decoding process of the current block.

In the case that the second syntax element indicates that the current block is not split using the quad-tree structure, the syntax element parsing unit 1601 parses at least one of a third syntax element indicating whether the current block is split using a binary-tree structure or a ternary-tree structure and a fourth syntax element indicating a split direction of the current block.

The split mode determination unit 1602 determines a split mode (or a split type) of the current block based on at least one of the first syntax element, the second syntax element, the third syntax element and the fourth syntax element. As an example, the split type may be determined as in Table 4, 5, 8, 9, 12, 13 and 17 described above according to the first syntax element, the second syntax element, the third syntax element and the fourth syntax element.

Furthermore, as described in embodiments 6 to 9 described above, the split mode determination unit 1602 may call a coding tree unit syntax for determining a split structure of the sub-block split from the current block based on the split mode.

Furthermore, as described in embodiment 9 described above, the first syntax element, the second syntax element, the third syntax element and the fourth syntax element may be parsed from a syntax of the same level.

Furthermore, as described in embodiment 7 described above, the split mode determination unit 1602 may parse a fifth syntax element indicating whether the current block split from a block of higher node using the binary-tree structure or the ternary-tree structure is split using the quad-tree structure.

FIG. 17 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 18 is a configuration diagram of a content streaming system as an embodiment to which the present disclosure is applied.

The content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

What is claimed is:

1. A video decoding method, comprising:
    parsing, by a processor, a first syntax element indicating whether a current block is split into a plurality of sub-blocks, based on a value of a horizontal direction coordinate of a top left sample of the current block added by a width of the current block being equal to or less than a width of a current picture, and a value of a vertical direction coordinate of the top left sample of the current block added by a height of the current block being equal to or less than a height of the current picture;
    parsing, by the processor, a second syntax element indicating whether the current block is split based on a stripe-tree structure in which a non-square block is split into subblocks of a same size, based on the first syntax element including information that the current block is split and one of the width and the height being equal to or greater than four times of the other of the width and the height;
    parsing, by the processor, a third syntax element and a fourth syntax element, based on the second syntax element including information that the current block is not split based on the stripe-tree structure, the third syntax element indicating whether the current block is split based on a binary-tree structure or a ternary-tree structure, the fourth syntax element indicating a split direction of the current block; and
    determining, by the processor, a split mode of the current block based on at least one of the first syntax element, the second syntax element, the third syntax element or the fourth syntax element,
    wherein the first, second, third, and fourth syntax elements are parsed in an order of the first syntax element, the second syntax element, and two of the third syntax element and the fourth syntax element.

2. The method of claim 1, further comprising:
    calling, by the processor, a coding unit syntax for a decoding process of the current block, based on the first syntax element including information that the current block is not split.

3. The method of claim 1, further comprising:
    calling, by the processor, a coding tree unit syntax for determining a split structure of the sub-block split from the current block based on the split mode.

4. The method of claim 1, wherein the first syntax element, the second syntax element, the third syntax element and the fourth syntax element are parsed from a syntax of a same level.

5. The method of claim 1, further comprising:
    parsing, by the processor, a fifth syntax element indicating whether the current block split from a block of higher node based on the stripe-tree structure, the binary-tree structure or the ternary-tree structure is split based on a quad-tree structure.

6. The method of claim 5, wherein the fifth syntax element is parsed based on the width being equal to the height, and the first syntax element is parsed further based on the fifth syntax element indicating that the current block is not split based on the quad-tree structure.

7. A video encoding method, comprising:
    generating, by a processor, a first syntax element indicating whether a current block is split into a plurality of sub-blocks, based on a value of a horizontal direction coordinate of a top left sample of the current block added by a width of the current block being equal to or less than a width of a current picture, and a value of a vertical direction coordinate of the top left sample of the current block added by a height of the current block being equal to or less than a height of the current picture;
    generating, by the processor, a second syntax element indicating whether the current block is split based on a stripe-tree structure in which a non-square block is split into subblocks of a same size, based on the first syntax element including information that the current block is split and one of the width and the height being equal to or greater than four times of the other of the width and the height;
    generating, by the processor, a third syntax element and a fourth syntax element, based on the second syntax element including information that the current block is not split based on the stripe-tree structure, the third syntax element indicating whether the current block is split based on a binary-tree structure or a ternary-tree structure, the fourth syntax element indicating a split direction of the current block; and
    determining, by the processor, a split mode of the current block based on at least one of the first syntax element, the second syntax element, the third syntax element, or the fourth syntax element, wherein the first to fourth syntax elements are generated in an order of the first syntax element, the second syntax element and two of the third syntax element and the fourth syntax element.

8. The method of claim 7, wherein the first syntax element, the second syntax element, the third syntax element and the fourth syntax element are generated at a same level.

9. The method of claim 7, further comprising:
generating, by the processor, a fifth syntax element indicating whether the current block split from a block of higher node based on the stripe-tree structure the binary-tree structure or the ternary-tree structure is split based on a quad-tree structure.

10. The method of claim 9, wherein the fifth syntax element is generated based on the width being equal to the height, and the first syntax element is generated further based on the fifth syntax element indicating that the current block is not split based on the quad-tree structure.

11. A non-transitory decoder-readable medium for storing one or more instructions executable by one or more processors and a bitstream generated by a video encoding apparatus, the one or more instructions controlling a video decoding apparatus to:
parse a first syntax element indicating whether a current block is split into a plurality of sub-blocks, based on a value of a horizontal direction coordinate of a top left sample of the current block added by a width of the current block being equal to or less than a width of a current picture, and a value of a vertical direction coordinate of the top left sample of the current block added by a height of the current block being equal to or less than a height of the current picture;
parse a second syntax element indicating whether the current block is split based on a stripe-tree structure in which a non-square block is split into subblocks of a same size, based on the first syntax element including information that the current block is split and one of the width and the height being equal to or greater than four times of the other of the width and the height;
parse a third syntax element and a fourth syntax element, based on the second syntax element including information that the current block is not split based on the stripe-tree structure, the third syntax element indicating whether the current block is split based on a binary-tree structure or a ternary-tree structure, the fourth syntax element indicating a split direction of the current block, and
determining a split mode of the current block based on at least one of the first syntax element, the second syntax element, the third syntax element, or the fourth syntax element,
wherein the first, second, third, and fourth syntax elements are parsed in an order of the first syntax element, the second syntax element, and two of the third syntax element and the fourth syntax element.

12. The medium of claim 11, wherein the first syntax element, the second syntax element, the third syntax element and the fourth syntax element are managed at a same level.

13. The medium of claim 11, wherein the one or more instructions control the video decoding apparatus to:
parse a fifth syntax element indicating whether the current block split from a block of higher node based on the stripe-tree structure, the binary-tree structure or the ternary-tree structure is split based on a quad-tree structure.

14. The medium of claim 13, wherein the one or more instructions control the video decoding apparatus to:
parse the fifth syntax element based on the width being equal to the height; and
parse the first syntax element further based on the fifth syntax element indicating that the current block is not split based on the quad-tree structure.

* * * * *